United States Patent [19]

Catiller et al.

[11] 4,290,106
[45] Sep. 15, 1981

[54] MICROPROCESSOR SYSTEM WITH SOURCE ADDRESS SELECTION

[75] Inventors: Robert D. Catiller, Garden Grove; Brian K. Forbes, Huntington Beach, both of Calif.

[73] Assignee: Burroughs Corporation, Detroit, Mich.

[21] Appl. No.: 52,477

[22] Filed: Jun. 27, 1979

[51] Int. Cl.³ .............................................. G06F 13/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,828,325 | 8/1974 | Stafford | 364/200 |
| 3,972,029 | 7/1976 | Bailey | 364/200 |
| 4,003,033 | 1/1977 | O'Keefe et al. | 364/200 |
| 4,080,649 | 3/1978 | Calle et al. | 364/200 |
| 4,084,236 | 4/1978 | Chelberg et al. | 364/200 |
| 4,106,092 | 8/1978 | Millers | 364/200 |
| 4,133,030 | 1/1979 | Huettner et al. | 364/200 |
| 4,162,520 | 7/1979 | Cook et al. | 364/200 |
| 4,174,352 | 11/1979 | Cook et al. | . |
| 4,189,769 | 2/1980 | Cook et al. | 364/200 |

*Primary Examiner*—Mark E. Nusbaum
*Assistant Examiner*—Thomas M. Heckler
*Attorney, Agent, or Firm*—Alfred W. Kozak; Nathan Cass; Kevin R. Peterson

[57] ABSTRACT

A microprocessor system having control lines and bus connections to an application dependent logic module having control logic, external registers and external memory for data transfers to/from a specific type of peripheral device. Addressing means are provided in said microprocessor whereby a program counter is used to address program memory and a memory reference register is used to provide addresses for access to external memory, and said memory reference register includes a low order bit field which selects whether the program counter or the memory reference register will be the address source for memory accesses.

12 Claims, 19 Drawing Figures

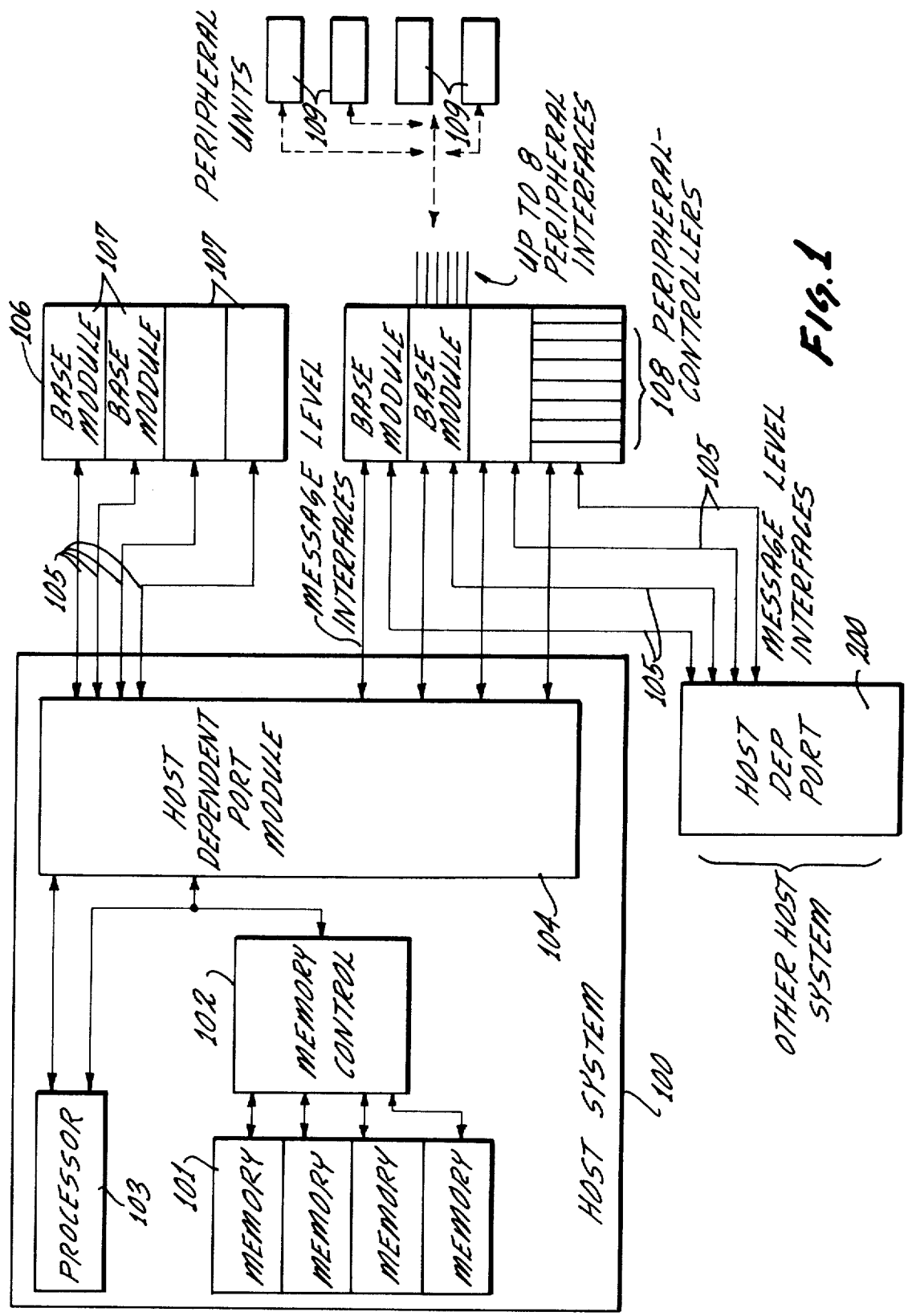

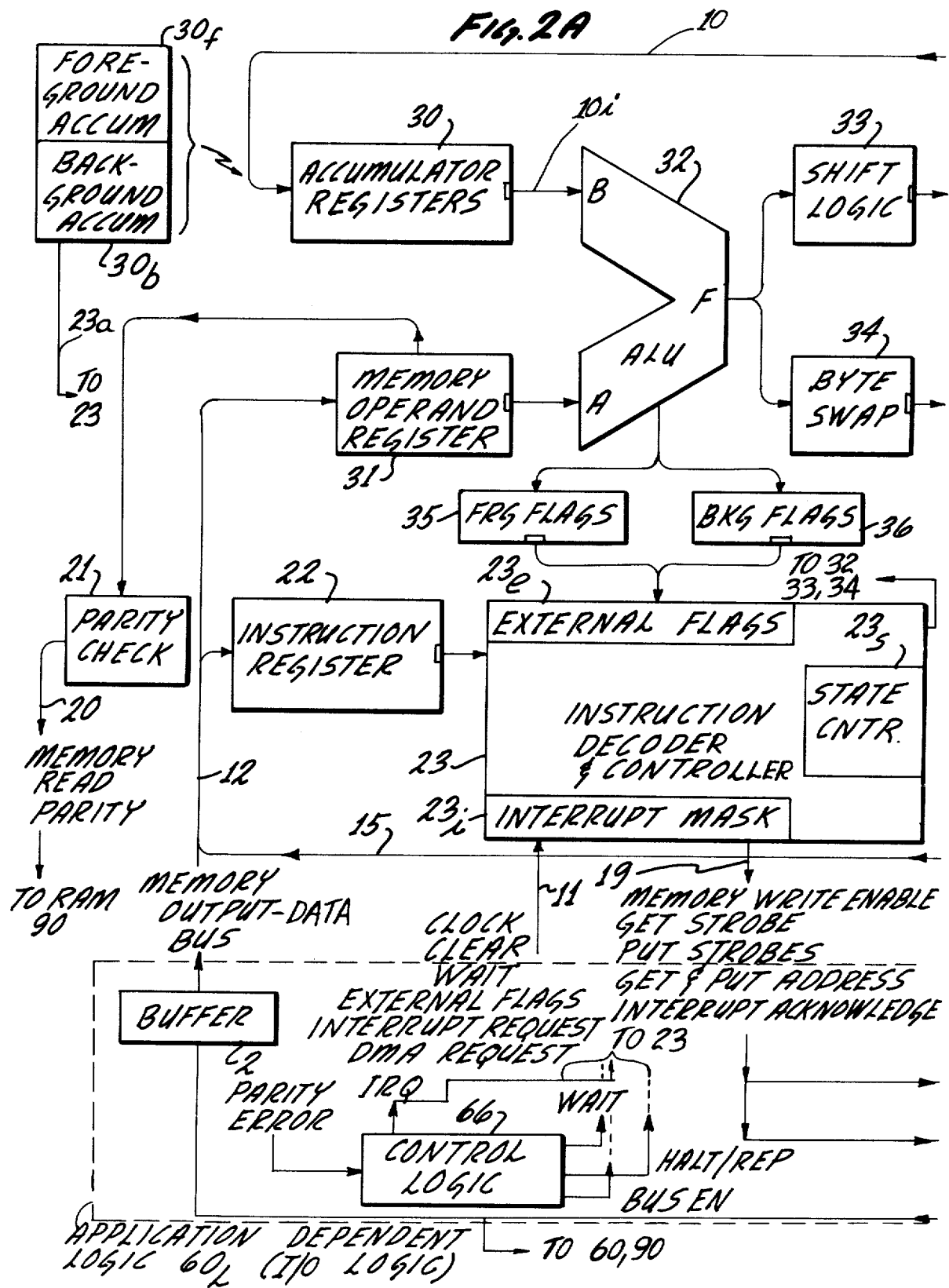

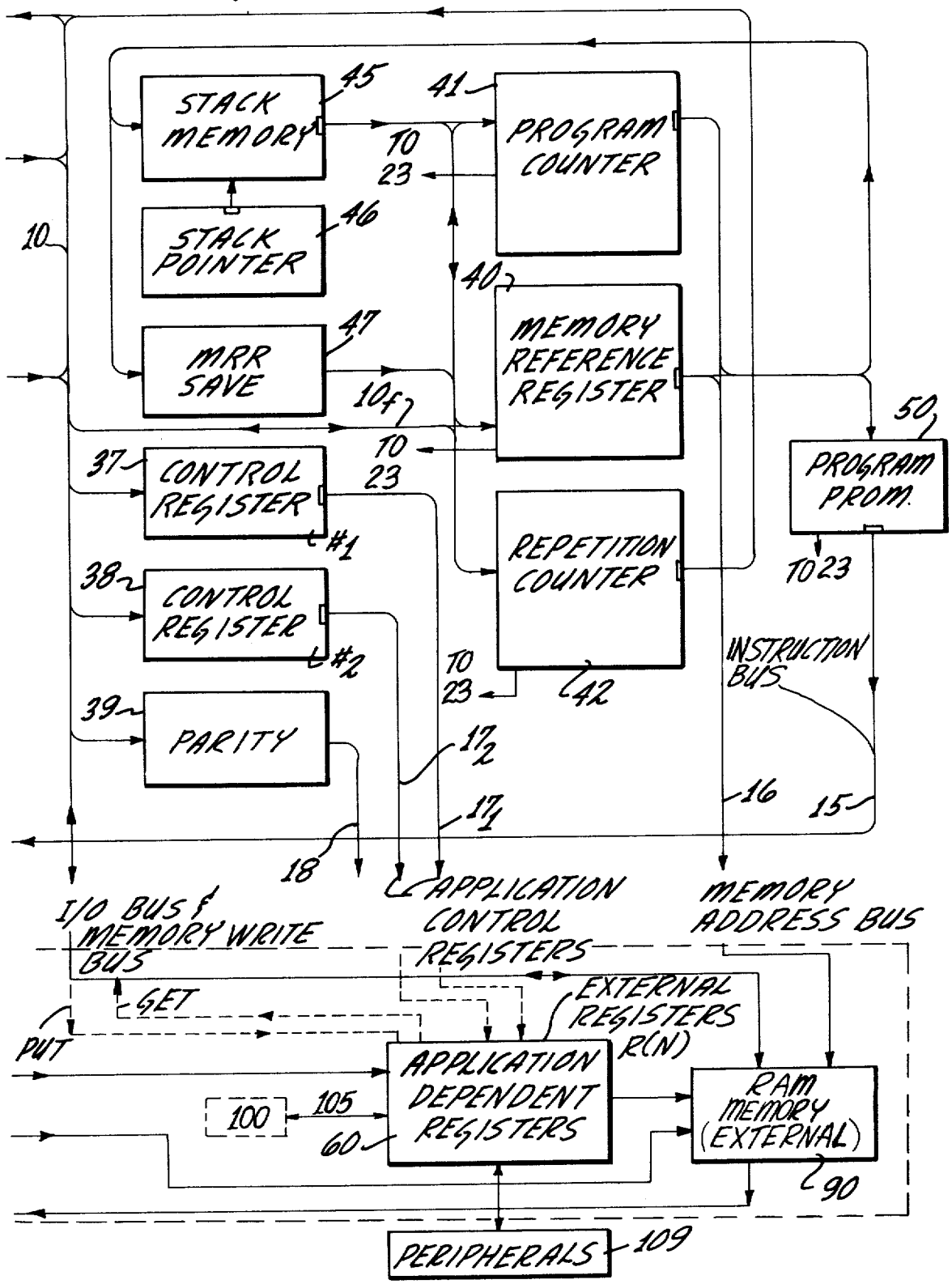

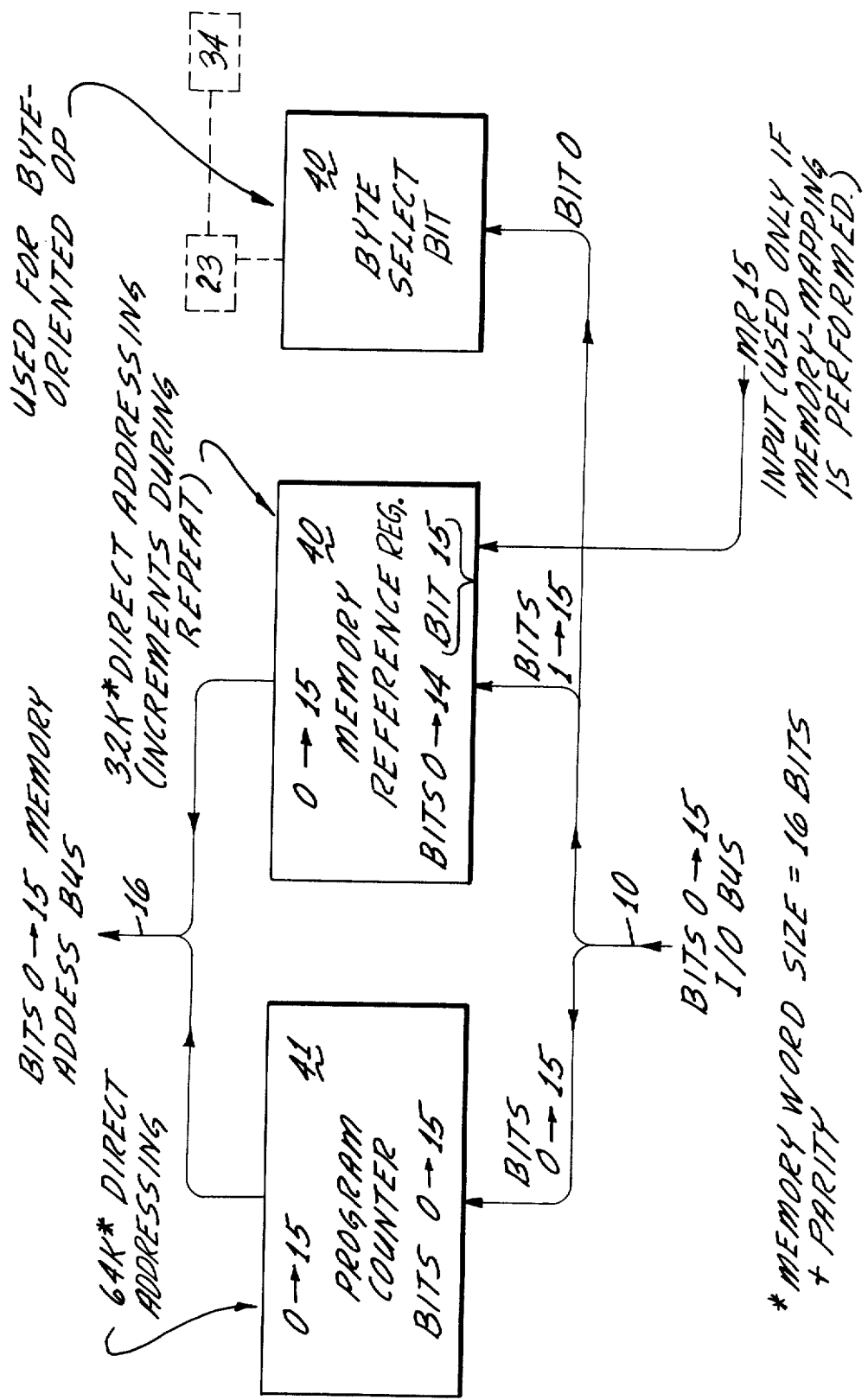

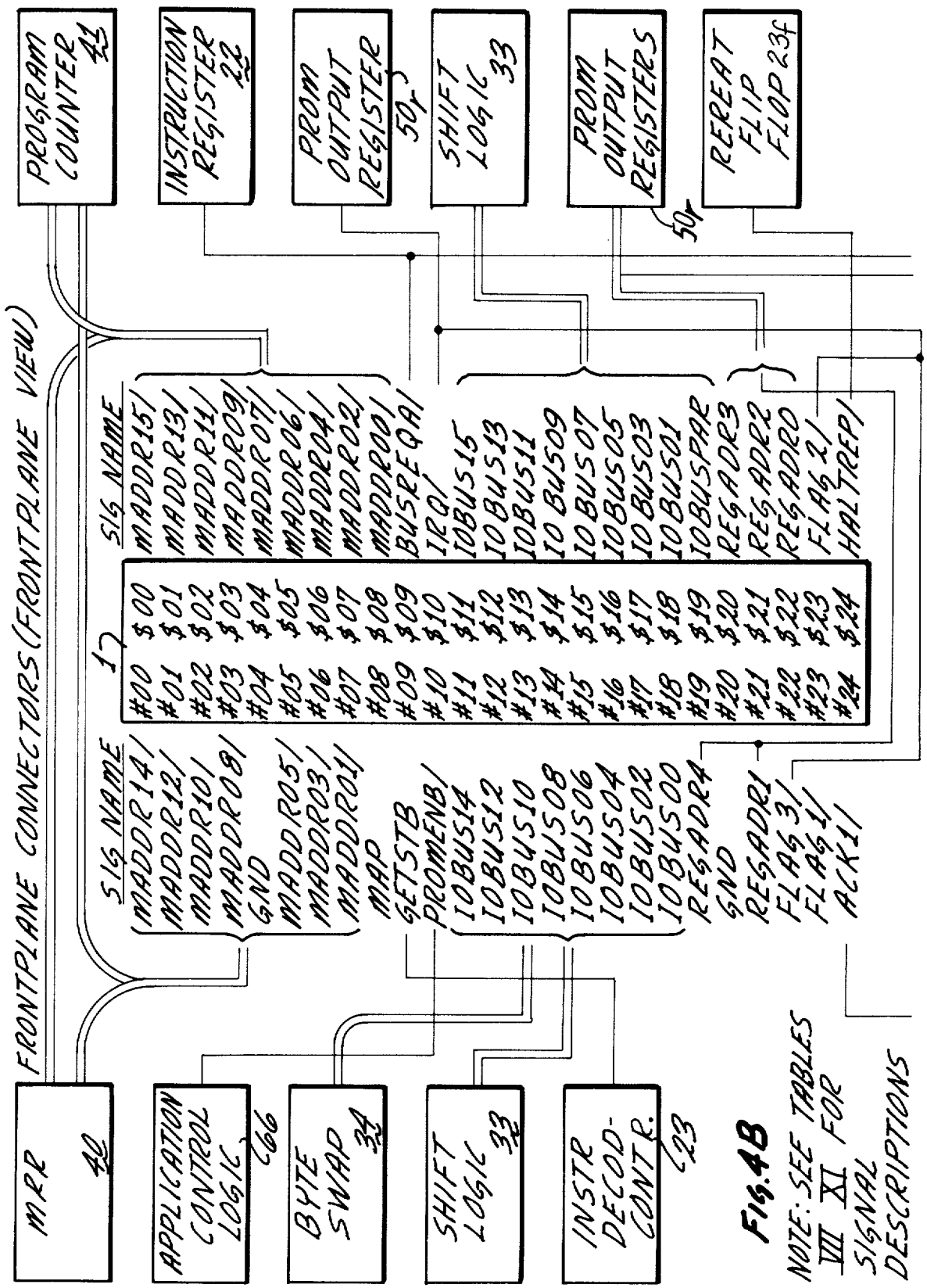

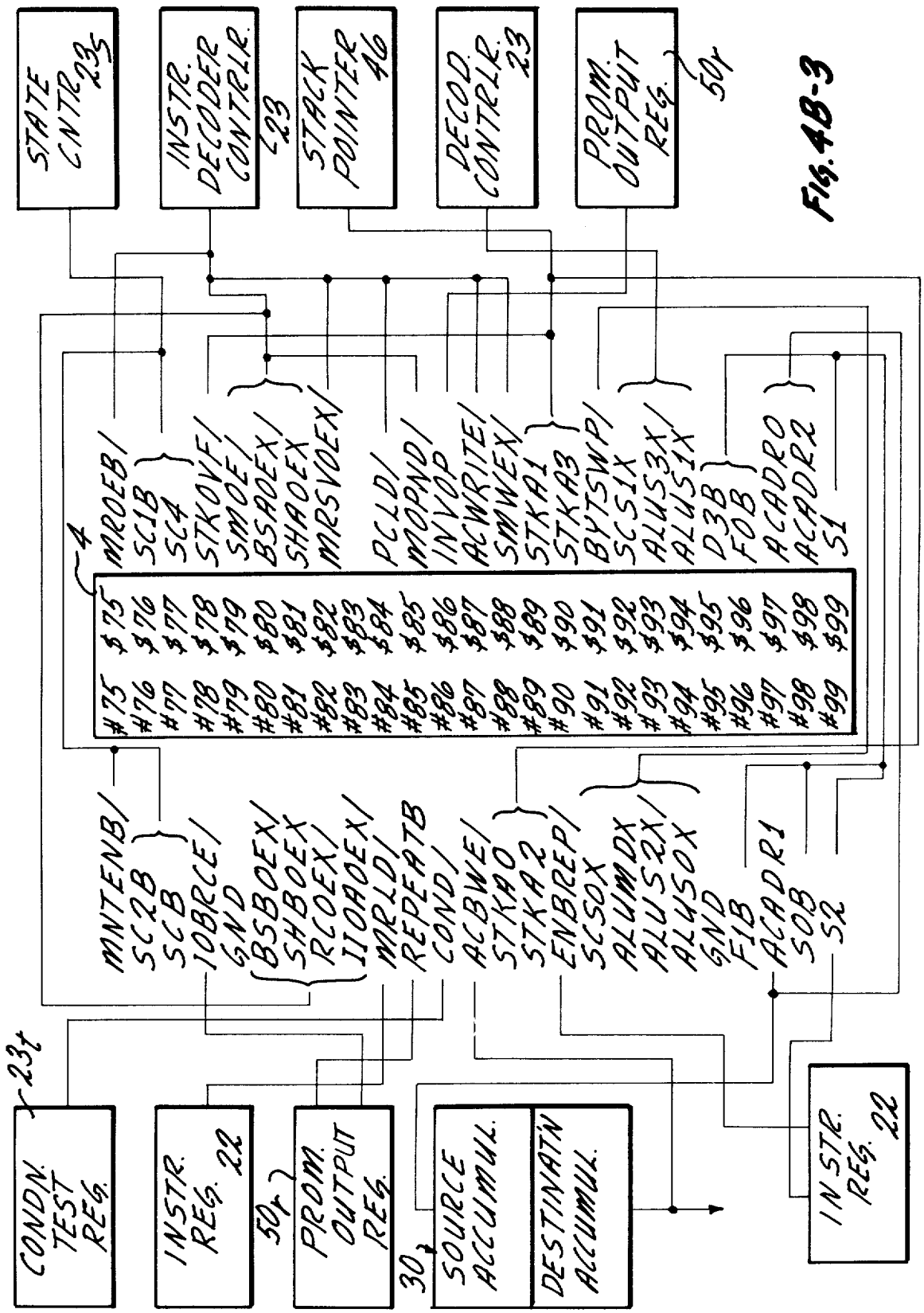

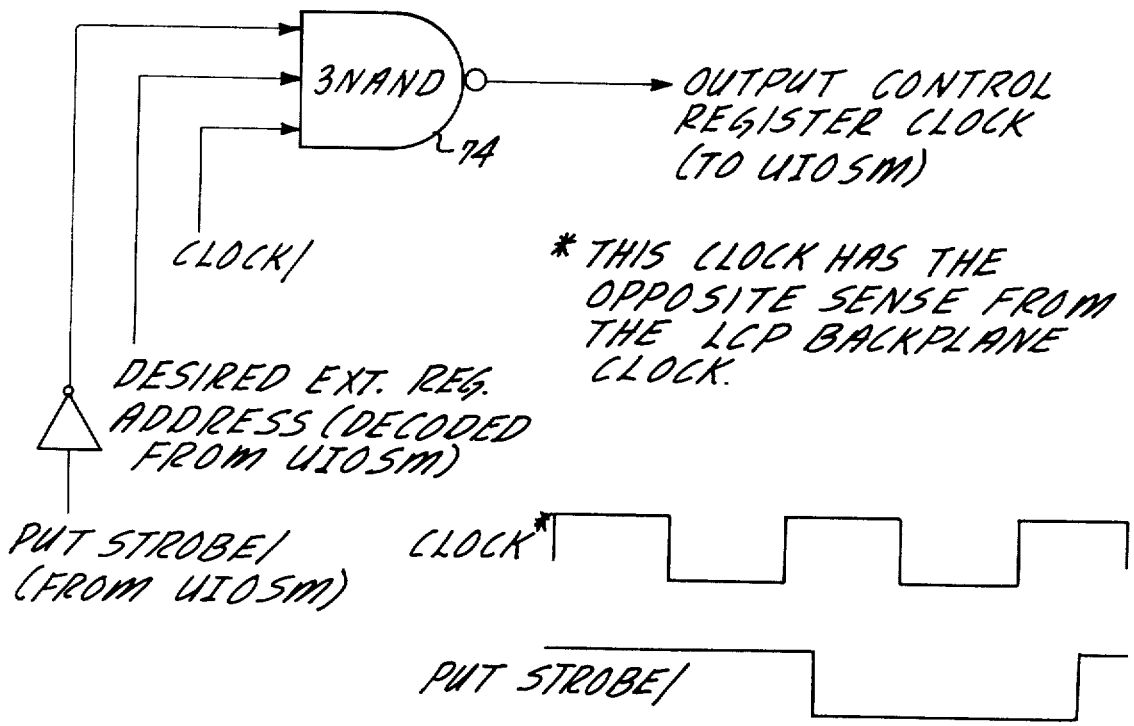
Fig.5 Clocking of output control registers (37, 38)
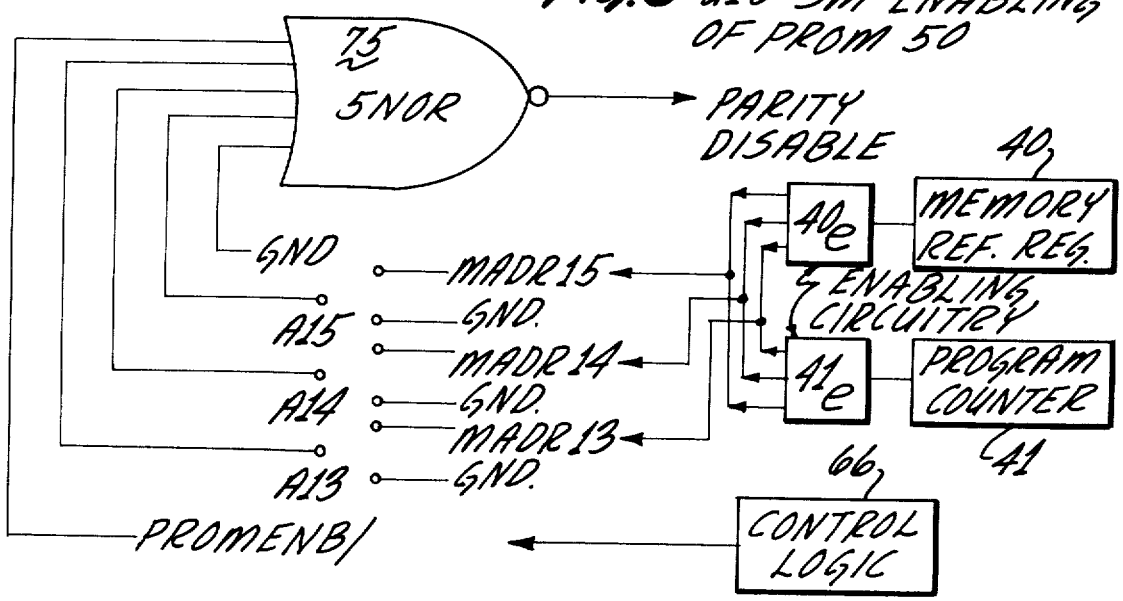
Fig.6 UIO-SM Enabling of PROM 50

TO INITIALIZE THE UIOSM, THE CLEAR LINE MUST BE TRUE (ACTIVE LOW) FOR AT LEAST TWO FULL CLOCK PERIODS.
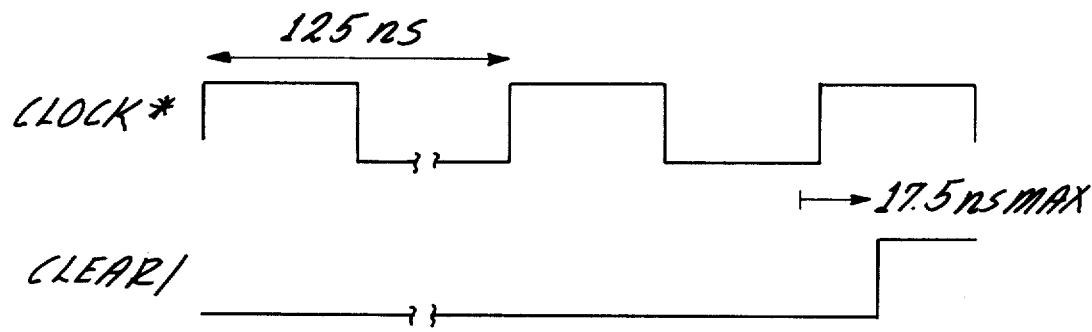
*THIS CLOCK HAS THE OPPOSITE SENSE FROM THE LCP BACKPLANE CLOCK.
Fig. 7 CLEAR LINE TIMING
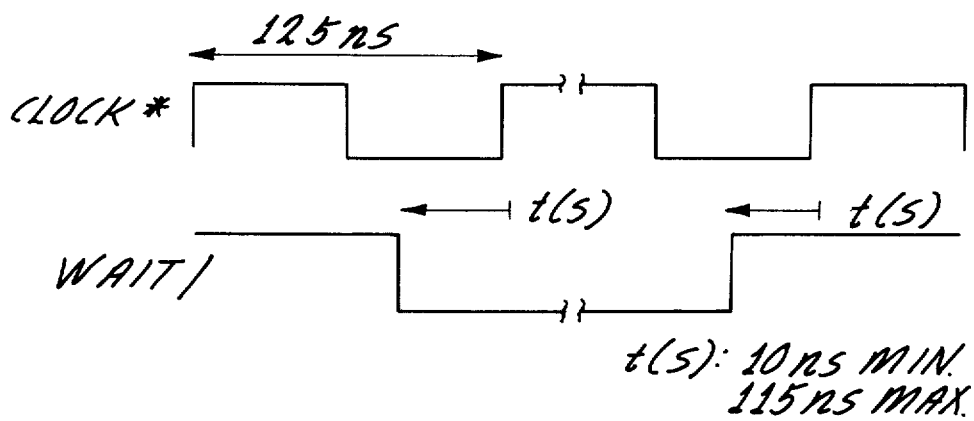
$t(s)$: 10 ns MIN.
115 ns MAX.
*THIS CLOCK HAS THE OPPOSITE SENSE FROM THE LCP BACKPLANE CLOCK.
Fig. 8 WAIT LINE TIMING

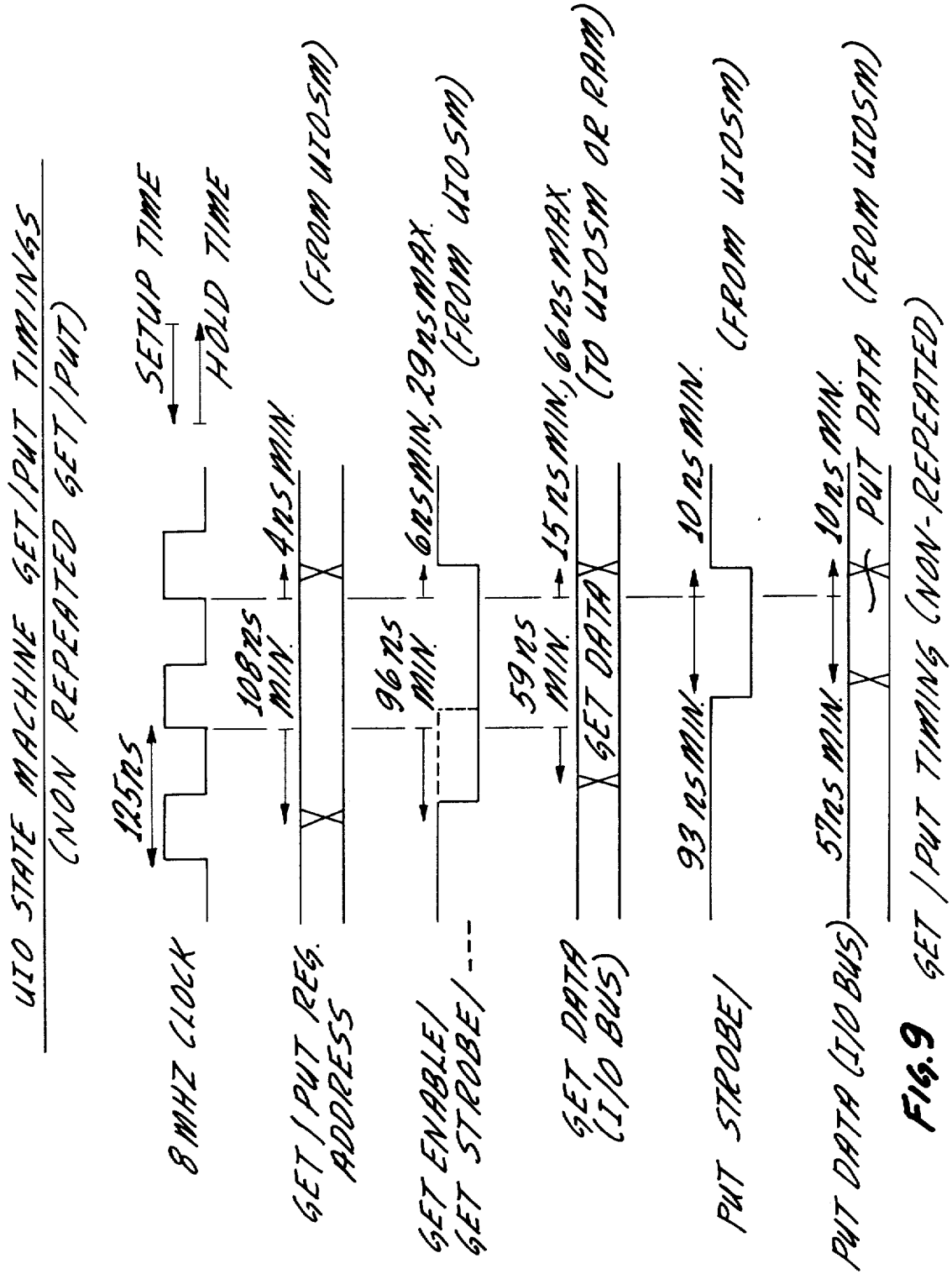
FIG. 9 GET/PUT TIMING (NON-REPEATED)

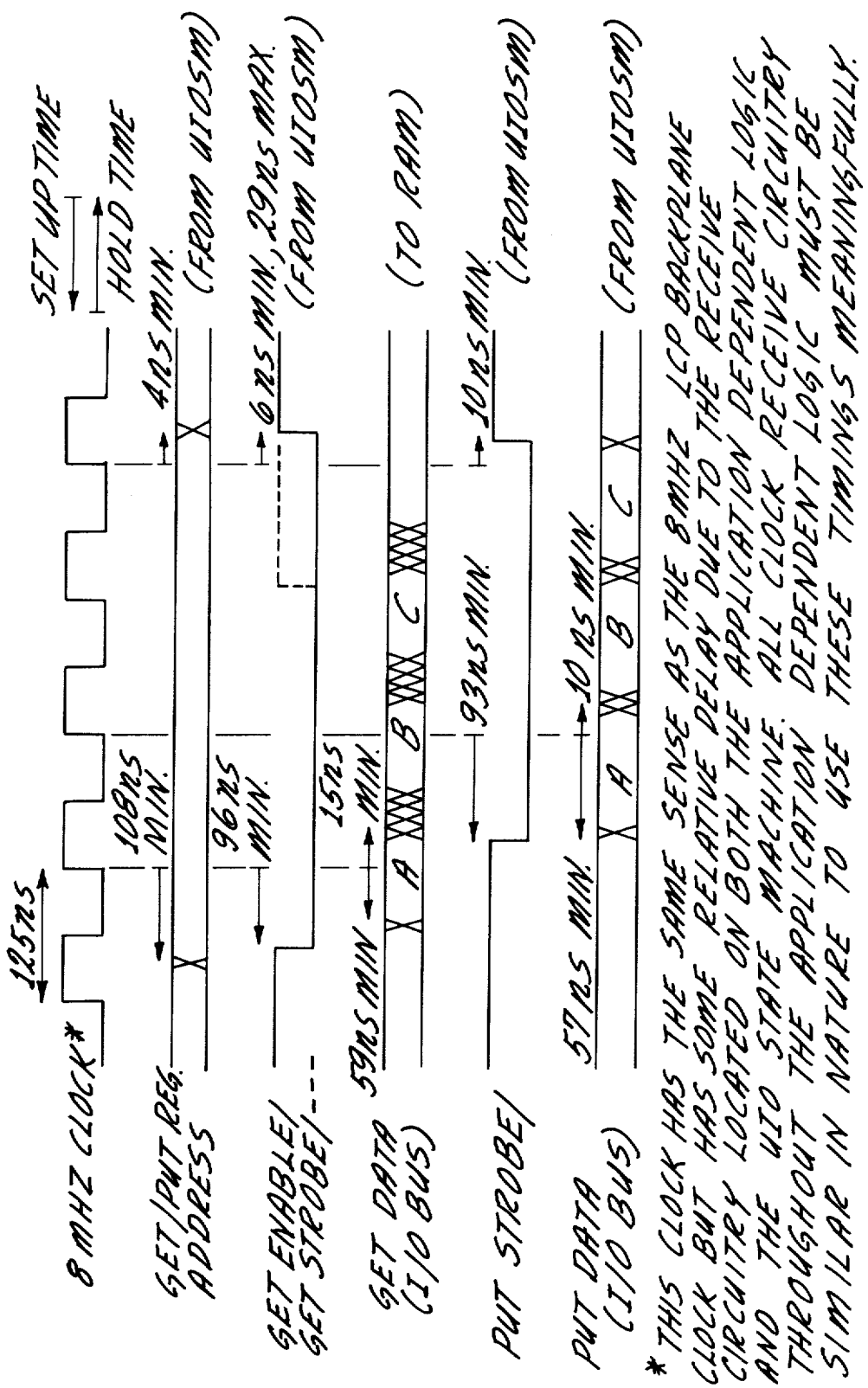

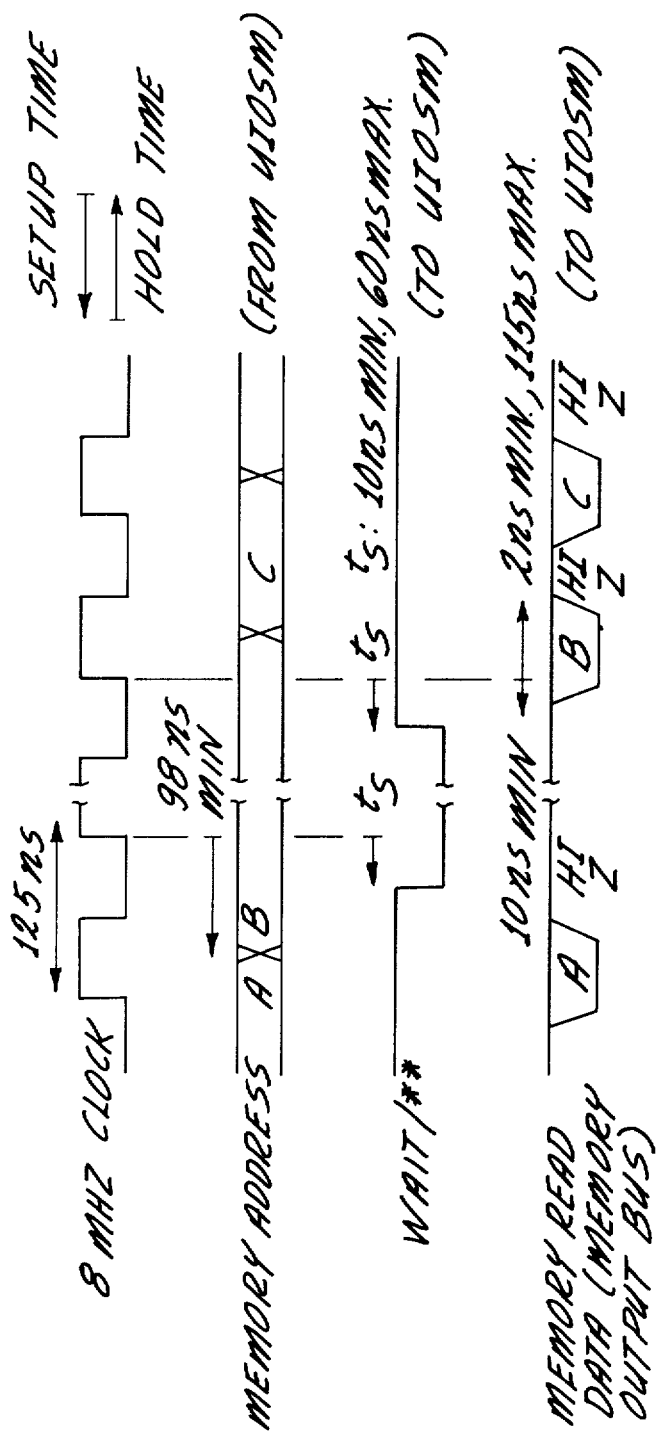
FIG. 11 MEMORY TIMING (READ) FOR UIO-SM
**THIS LINE IS USED BY SLOW ACCESS MEMORY DEVICES TO ALLOW ONE OR MORE EXTRA CLOCK PERIODS FOR DATA ACCESS. THIS LINE CAN BE USED IN THE SAME MANNER FOR LONGER MEMORY WRITES AS WELL AS TO HALT THE MACHINE IN GENERAL.

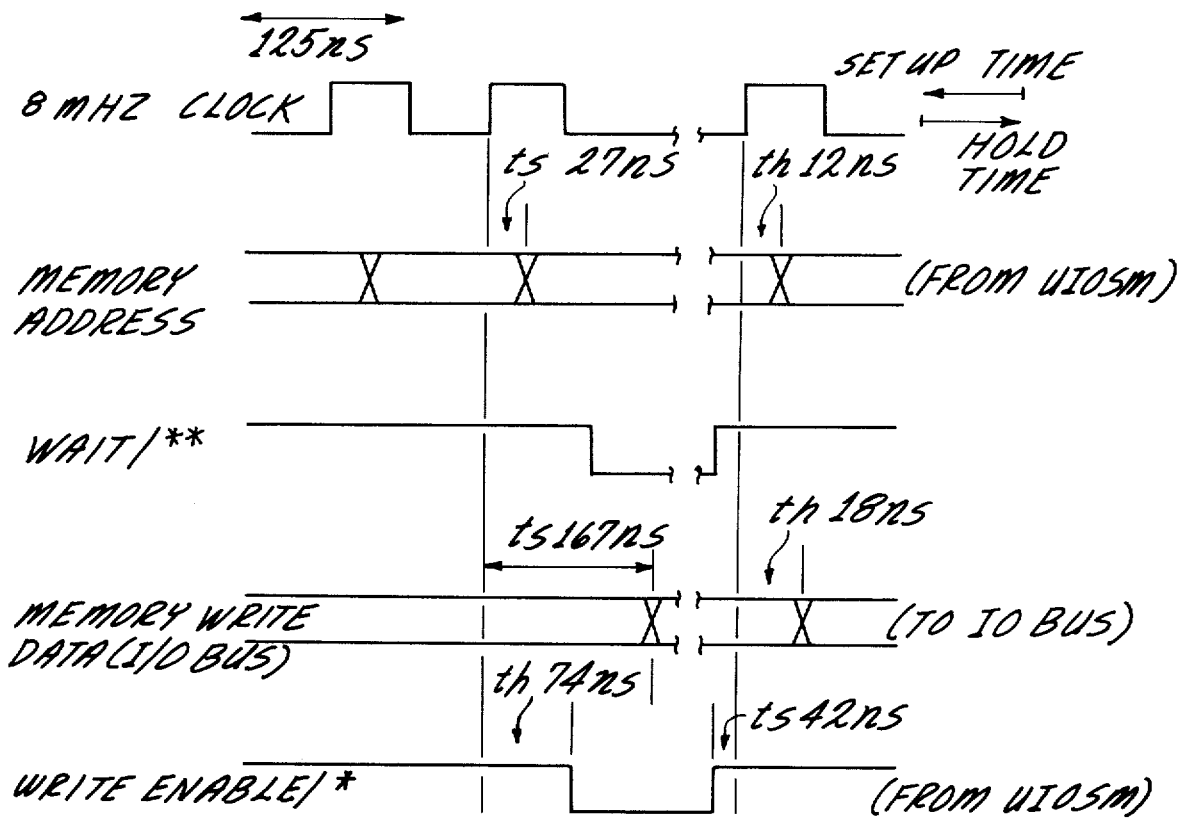

*THIS SIGNAL IS LOW FOR ONE CLOCK CYCLE (125ns) DURING GET INSTRUCTIONS AND TWO CLOCK CYCLES (250ns) DURING WRTW OR WRTB INSTRUCTIONS. THIS SIGNAL WILL NOT BE EXTENDED IF ADDITIONAL WAIT STATES ARE INJECTED. AN EXTERNALLY GENERATED RAMWE/ SIGNAL WILL BE REQUIRED FOR MEMORY DEVICES THAT USE ADDITIONAL WAIT STATES.

**THIS LINE IS USED FOR A LONGER MEMORY WRITE CYCLE FOR SLOW WRITE MEMORY DEVICES. THIS LINE CAN BE USED IN THE SAME MANNER FOR LONGER MEMORY READS AS WELL AS TO HALT THE MACHINE IN GENERAL.

FIG. 12  MEMORY TIMING (WRITE) FOR UIO-SM

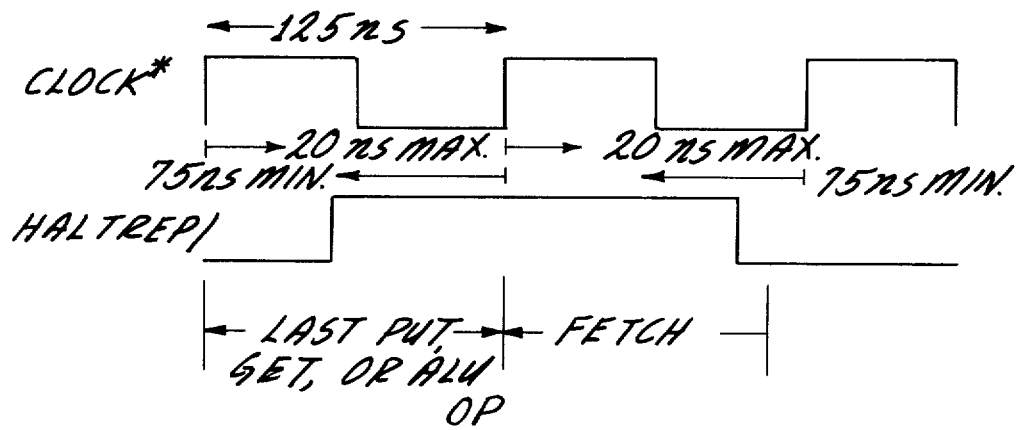
FIG. 13 HALT REPETITION TIMINGS
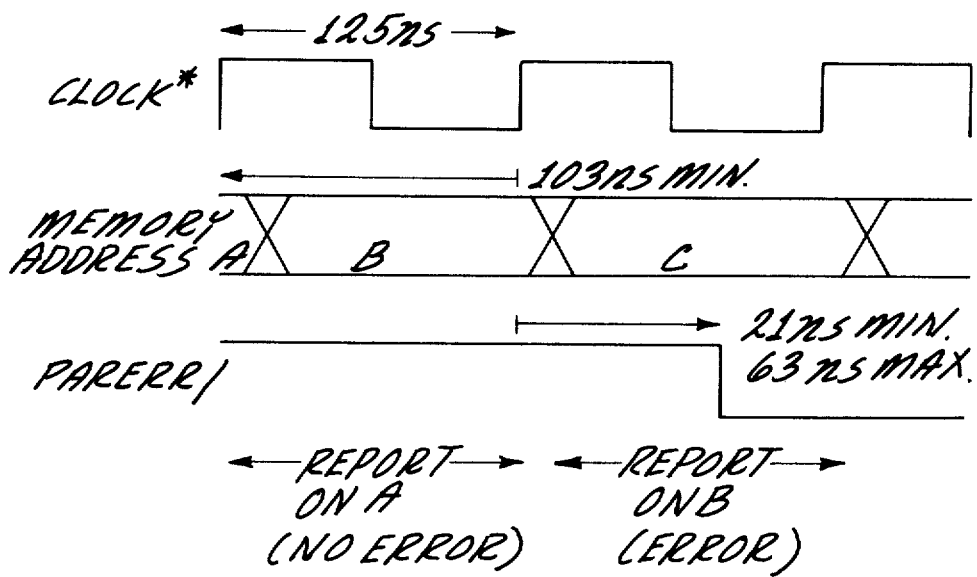
FIG. 14 PARITY ERROR REPORT TIMING

MICROPROCESSOR SYSTEM WITH SOURCE ADDRESS SELECTION

BACKGROUND: FIELD OF THE INVENTION

This invention relates to a microprocessor system that employs a program PROM for instruction storage, an arithmetic logic unit for processing data, associated registers and circuitry, working in conjunction with an external application dependent control logic module having external memory, registers and control logic for communicating to peripheral devices.

CROSS REFERENCES TO RELATED APPLICATIONS

This application is related to the following patent applications which have been filed on even date:

A patent application entitled "Microprocessor System Facilitating Repetition of Instructions", inventors Robert Catiller and Brian Forbes, filed June 27, 1979, U.S. Ser. No. 052,687.

A patent application entitled "Microprocessor System Operating with Normal or Slow Memories", inventors Robert Catiller and Brian Forbes, filed June 27, 1979, U.S. Ser. No. 052,821.

A patent application entitled "Microprocessor Having Word and Byte Handling", inventors Robert Catiller and Brian Forbes, filed June 27, 1979, U.S. Ser. No. 052,478.

A patent application entitled "Digital System for Data Transfer Using Universal Input-Output Microprocessor", inventors Robert Catiller and Brian Forbes, filed June 27, 1979, U.S. Ser. No. 052,336.

A patent application entitled "Dual Mode Microprocessor System", inventors Brian Forbes and Robert Catiller, filed June 27, 1979, U.S. Ser. No. 052,479.

A patent application entitled "Microprocessor System with Specialized Instruction Format", inventors Brian Forbes and Robert Catiller, filed June 27, 1979, U.S. Ser. No. 052,350.

PRIOR ART

Microprocessors and microprocessor systems will be seen to generally follow the architectural formulas and interrelationships which were established from general computer technology. However, microprocessors making use of large scale integrated techniques can be made into small packages with the use of integrated circuit chips and will generally follow the pattern of using a central processing unit, memory input-output circuits and various other control and support circuitry.

It is typical that the architecture of microprocessors will generally use a program counter which is used to select some portion of memory to be addressed for retrieving program instruction codes to be executed.

In the usage of a system where a central or main host processor operates in conjunction with a number of remotely located "base modules" which base modules support a group of peripheral-controllers which service and control external peripheral units, a considerable amount of circuitry has been required to provide data transfer capability on an efficient basis and also to cater to the specific needs of each type of peripheral unit.

Heretofore each peripheral-controller which was situated in a base module was burdened with many processor and control circuits for handling the specific requirements of each peripheral terminal unit leading to a heavy burden of circuitry in each peripheral-controller.

SUMMARY OF THE INVENTION

To alleviate the burden of costly circuitry for each peripheral controller, a universal or architecturally standard microprocessor was developed which would provide a multiplicity of processing functions for each peripheral-controller so that the peripheral-controller would only need a limited amount of application dependent logic and circuitry tailored to the particular peripheral which it serviced. Thus, the universal processor, or as it is called here the "universal I/O state machine", could serve as a standard unit for all types of peripheral-controllers so that each of the peripheral-controllers would only need to have the minimum amount of circuitry required for application to a particular peripheral.

Thus, with the use of the universal I/O state machine as a general purpose microprocessor in these applications, it became possible to reduce the cost, the quantity of circuitry, the space requirements and the system of architectural arrangements so that a more economical and more efficient architectural system could be established. Thus, with the advent of the described universal I/O state machine, there has been devised a generalized type of microprocessor which can serve with any type of peripheral-controller in a base module thus to handle any variety of peripheral terminal units. This generalized and simplified type of microprocessor (oriented to (a) addressing instructions and data and (b) manipulating data) executes its operations very rapidly and is designed to handle individual bytes for operations with peripheral devices which are "byte" oriented and also can execute processing and transfer operations with complete words (a word here being two 8-bit bytes symbolized as AB) for use with peripheral terminals which are "word oriented" and which can accept or transmit full words.

The universal microprocessor working in conjunction with the peripheral oriented application logic permits the development of a variety of peripheral-controllers whose advantage is in respect to the minimal amount of circuitry needed to adapt to the pecularities of any given peripheral device. Since the hardware and programming of the microprocessor remains standard and constant for each of the peripheral-controllers, it is thus possible to accomplish not only great versatility in data transfer and control features but also to provide great economies in circuitry and cost.

In digital systems where many instructions and control signals are required for the transfer of data to a variety of different types of peripheral units, generally a specifically tailored and designed peripheral-controller is provided which is particularly suited to handle the data transfers to and from a single particular type of peripheral unit. It was found that by providing a uniform microprocessor for all types of peripheral-controllers which only varied in the type of application dependent logic required for specific types of peripheral devices, that great economies of space and cost could be realized. Thus, the combination of a universal microprocessor working in conjunction with an application dependent module could serve the function of a peripheral-controller in an optimum fashion.

The microprocessor of the present system provides a processor or arithmetical logic unit, a program memory, memory address means which includes a program counter for addressing internal program memory, and a memory reference register for addressing external memory in said application dependent logic module. An instruction register receives instructions from said program memory (or external memory) on an instruction bus which is conveyed to an instruction decoder-controller. A plurality of addressable accumulator registers connects to an input-output bus and temporarily stores data for input to said arithmetic logic unit. A stack memory saves data from the program counter during interrupt actions while a memory-save register saves data from said memory reference register during interrupt operation. An instruction decoder-controller generates and receives control signals to and from said application dependent logic module, in addition to providing control signals to the universal microprocessor.

The instruction word format in the program memory provides a single bit field (M) which is used to select between the program counter or the memory reference register as the operating source of addresses for memory access. Thus, in one condition of the M bit field, as "true", (or M=1) the memory reference register will be selected as the source of addresses for accessing external or program memory; while if the bit field value be "false" (or M=0) there will be selected the program counter as the source of memory addresses to be used in accessing data from program or external memory.

BRIEF DESCRIPTION OF THE DRAWINGS

FIG. 2 is subdivided into two portions designated as FIG. 2A and FIG. 2B such that by juxtaposing FIG. 2A to the left of FIG. 2B (and FIG. 2B to the right of FIG. 2A) the continuity of connections between the two drawings may be seen.

FIG. 3 is a schematic diagram showing certain memory addressing features of the UIO-State Machine, particularly the use of a dedicated bit designated as the "byte-swap" bit.

FIG. 4B is oriented such that it shows the first front plane connector while FIG. 4B-1 shows the second front plane connector. Orientation-wise the FIG. 4B-1 can be juxtaposed underneath the FIG. 4B in order to provide continuity to the connections shown between the two front plane connectors. FIG. 4B-2 illustrates connections to the front plane connector No. 3 and FIG. 4B-3 illustrates the connections to the front plane connector No. 4.

FIG. 5 is a timing diagram showing the clocking of output control registers of the UIO-state machine.

FIG. 6 is a circuit drawing showing how the program memory is enabled.

FIG. 7 is a timing diagram for the clear line.

FIG. 8 is a timing diagram showing the WAIT line timing.

FIG. 9 is a timing diagram showing timing for non-repeated GET/PUT functions.

FIG. 10 shows the timing diagrams for the repeated GET/PUT functions.

FIG. 11 is a diagram showing the correlated timing features for reading data from external memory on the memory data bus.

FIG. 12 is a timing diagram showing the timing correlations between the clock, the memory address signal and the memory write data on the I/O bus.

FIG. 13 is a timing diagram showing the relationship of the halt repetition function signal to the clock.

FIG. 14 is a timing diagram showing the relationship of the parity error signal to the clock and memory address signal.

DESCRIPTION OF THE PREFERRED EMBODIMENT

Figure 4A:
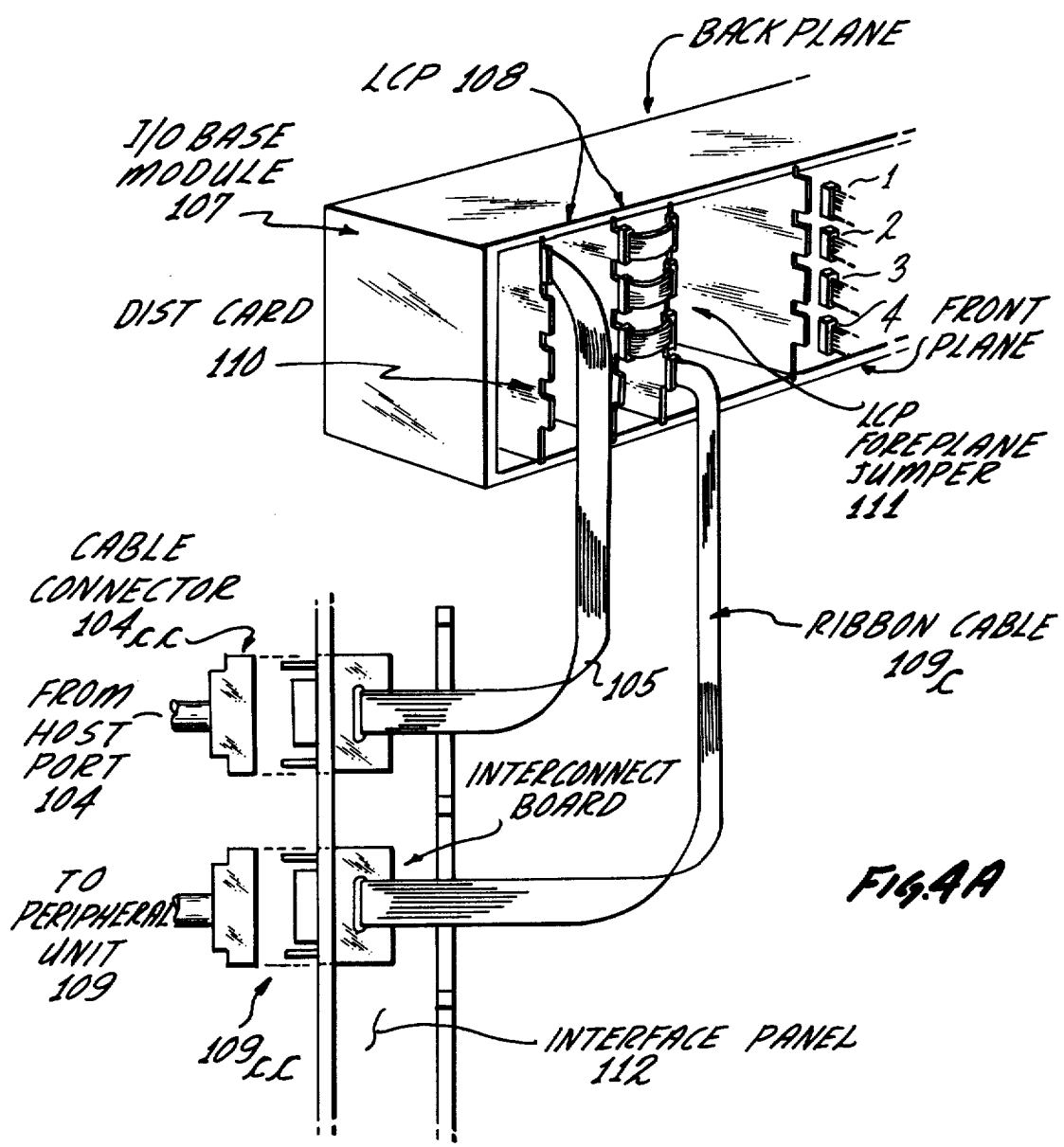
FIG. 4A is a perspective drawing of the input-output base module and showing major elements such as the distribution control card, the peripheral controller (line control processor) card and certain connections from the front plane (fore plane) to the host computer and to peripheral units.
Figures 1, 4B:
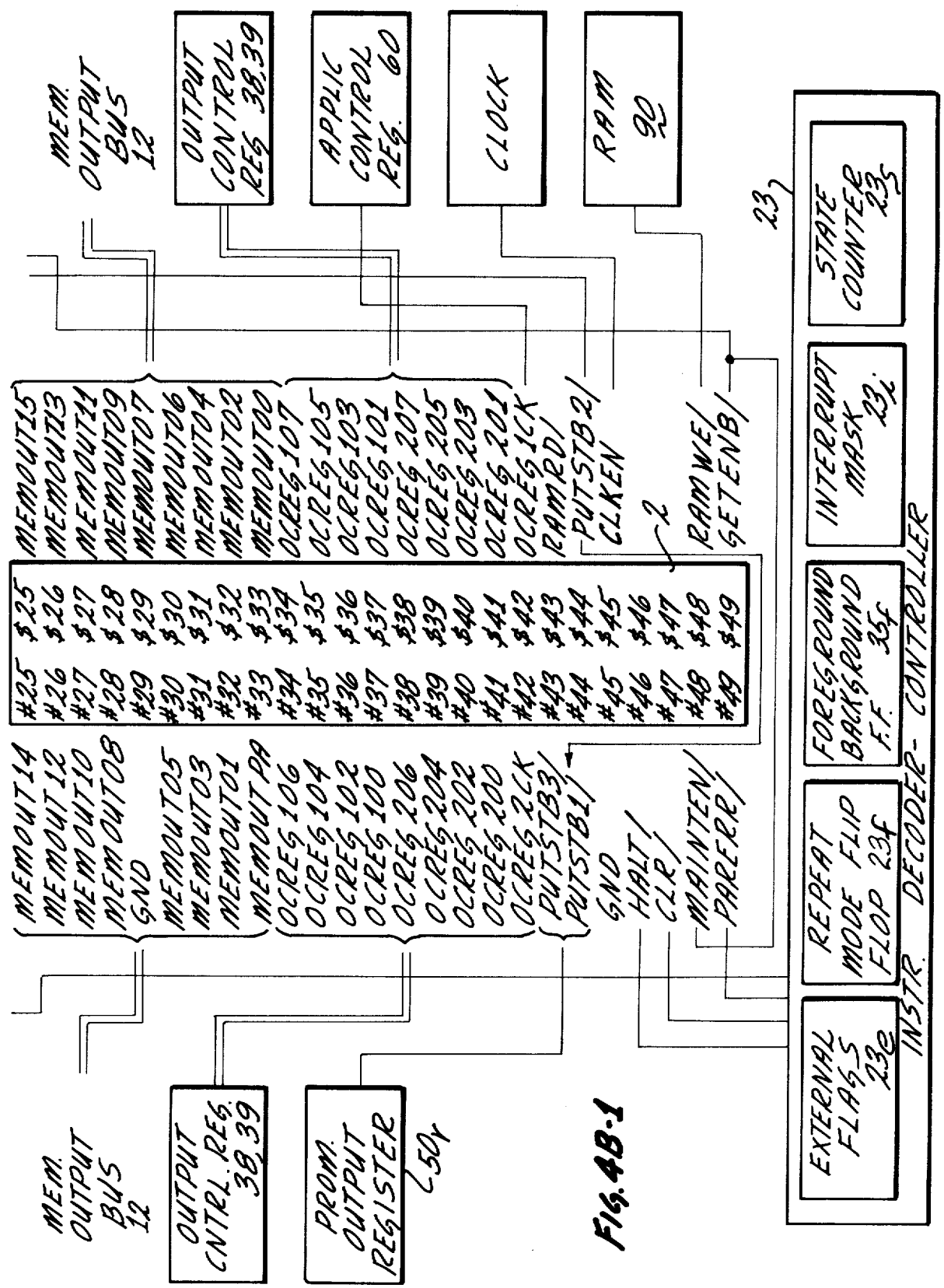
FIG. 1 is an overall block diagram illustrating the use of a main host system computer with a plurality of base modules which support peripheral-controllers which communicate with peripheral devices.
FIG. 4B is a schematic drawing showing circuit connections to the four front plane connectors.

Referring to FIG. 1, there is seen a system block diagram of a typical Burroughs B 6800 host computer system, with central processing unit cabinet 100 having basically a series of main memory modules 101, a memory control module 102, a data processor module 103, working in cooperation with a host dependent port module 104. The host dependent port module provides a series of communication cables 105 designated as MLI or message level interfaces. These message level interfaces provide communication lines to a base module cabinet 106 (or a plurality of such cabinets) which are designated as the Universal Input/Output Base Module Cabinet. The base module cabinet is built to support a plurality of universal input/output (UIO) base modules 107. Each of these UIO base modules provides communication, control, and data transfer lines to specific types of peripheral devices.

It should be noted that the host dependent port module can have message level interfaces to a plurality of UIO base module cabinets. And likewise, each UIO base module cabinet may have message level interface communication lines to other host systems 200 (main memory and processor) in addition to the first described host system of FIG. 1.

In the preferred embodiment of the system to be described herein, it will be seen that a base module cabinet can support from one to four UIO base modules. Each of the UIO base modules may contain up to eight peripheral-controllers 108 known as "line control processors" and each of the line control processors will be dedicated to data transfer and control with a particular type of peripheral device 109.

Another provision of the system will allow for a unit designated as a line expansion module (LEM) which can be inserted in the UIO base module so that a single message level interface can be extended to communicate with up to eight UIO base modules.

The host system as represented by the central processing unit cabinet 100 can communicate with up to 64 peripheral controllers (line control processors) for each message level interface (MLI), if the base module is provided with the unit known as an LEM or line expansion module.

As seen in FIG. 1, the host system 100 can have eight message level interfaces (MLI) and can thus communicate with up to 512 peripheral controllers (line control processors).

The basic features of the Burroughs B 6800 host computer system may be understood in greater detail by reference to Burroughs reference manual No. 500 1290, copyright 1977, and published by the Burroughs Corporation of Detroit, Mich. 48232.

The peripheral controllers or line control processors (LCP) are controllers which are dedicated to data transfer and control between a peripheral terminal and the main host system or a plurality of host systems.

The peripheral controllers known as line control processors have been described, both in their system interrelationships and in their internal workings, in a number of previously filed patent applications and issued patents. These include the following U.S. Patents: U.S. Pat. No. 4,174,352 entitled "Modular Block Unit for I/O Subsystem", inventors Darwen J. Cook and Donald A. Millers, II; U.S. Pat. No. 4,106,092 entitled "Interface System Providing Interfaces to Central Processing Units and Modular Processor-Controllers for an Input-Output Subsystem", inventor, Donald A. Millers, II; U.S. Pat. No. 4,162,520 entitled "Intelligent Input-Output Interface Control Unit for Input-Output Subsystem", inventors Darwen J. Cook and Donald A. Millers, II; and U.S. Pat. No. 4,189,769, entitled "I/O Subsystem for Digital Data Processing System", inventors Darwen J. Cook and Donald A. Millers, II, and these patents are included herein by reference.

The peripheral controllers known as line control processors (LCP's) may generally fall into types of categories. There is the 2-card LCP and the 3-card LCP.

The 2-Card LCP

This peripheral controller has a first card which is designated as the CFE or common front-end on which there are supplied a plurality of read-only memories (ROM's); hardware-wise these common front-end cards are of the same construction and nature except that in individual cases the ROMs are made to hold different programs which are suitable to the application at hand or the peripheral device with which it is used; thus, hardware-wise all the front-end cards will be found to be the same physically but only differ in the fact that different program material is inserted in the individual ROMs. The second card in the 2-card LCP is the PDC or peripheral dependent card. This card is uniquely built and adapted to suit the particular type of peripheral unit to which it communicates. It may be designated as an "application dependent logic module".

The 3-Card LCP

Here, again, the first card is the CFE or common front-end card which is physically the same except for different programming inside the ROM, this program being varied according to the application required. The second card is the CDC or common data card which is tailored to suit the requirements of different peripheral units; however, it may be the same for such a group of items as magnetic tape, punched card-tape, disk pack, and console controls. The third card of the 3-card LCP is designated as the PDC or peripheral dependent card. This card is unique and is designed to handle one particular type of peripheral device.

In FIG. 4A there is seen a more detailed perspective drawing of a typical I/O base module 107. A plurality of these base modules are housed and serviced by a base module cabinet 126 of FIG. 1.

The base module 107 provides housing whereby printed circuit cards holding integrated circuitry may be inserted on sliding tracks in order to connect with the backplane connectors for automatic connection into the system. A peripheral controller (or line controller processor) 108 may require, as previously described, two printed circuit or three printed circuit cards. The base module may support up to eight such peripheral controllers in its housing. Communications between the base module and the host system are controlled by distribution card 110. Other specialized handling printed circuit cards may be inserted, such as the previously mentioned line expansion module, common front-end card, common data card; or a second distribution control card, etc., can be inserted for connection into said base module 107.

The frontplane or foreplane permits jumper cable connections 111 (FIG. 4A) between printed circuit cards and also permits connection cables such as message level interface 105 to the host computer or ribbon cable $109_c$ to permit connection from the base module to external devices such as peripheral device 109.

An interface panel 106 may be provided on the base module cabinet 120 to provide for cable connectors such as $104_{cc}$, $109_{cc}$ to facilitate disassembly and reconnection.

As was described in the previously mentioned patent references regarding line control processors, each base module unit is provided with a Distribution Control Card 110, FIG. 4A, which connects the message level interface from the main host system to a selectively addressed line control processor (peripheral-controller) in that base module. Further, the base module has a common maintenance card and a common termination card which acts in common to service the entire group of up to eight line control processors in a base module.

The UIO base module may also support a line expansion module or LEM. This feature expands the usage of a UIO base module by adding another Distribution Control Card which permits connection of that base module to yet another main host system in addition to the one already connected to the first Distribution Control Card. Thus, communication from a main host system can be expanded to cover two or more UIO base modules and their attendant line control processors. Likewise, two or more host systems can be made to communicate to a UIO base module or a plurality of such base modules.

When it is desired to have one UIO base module connected to two main host computers, then a control card is used which is called the BCC or base control card. The base control card serves two basic functions; (a) to provide an interlock when multiple host computers try to access a base module, so that line control processors can thus be locked out from use by unauthorized host computers, and (b) to provide assorted features such as a base identification (ID) number and for maintenance control The BCC is not mandatory when multiple hosts are connected to a base; however, it is useful. The base control card, however, can also be used when only a single host computer is connected to the UIO base module. Thus, the BCC is an independent and optional module, as is the line expansion module LEM.

Thus, in reference to FIG. 1, it should be stated that when a host computer is connected to a UIO base module, the base module must have at least one distribution card 110, FIG. 4A, for each host computer which is connected to it. Now, when a UIO base module is connected to a multiple number of host computers, then there is need for the base module to be provided with a unit known as the PSM or path selection module. The path selection module is the control unit which regulates the communication to and from the multiple number of distribution cards in the UIO base module.

In the development of line control processors, such as indicated in the prior cited patents and references, it was found that the amount of logic required for adaptability to any given type of peripheral unit or to a variety of peripheral units required that expensive and space consuming logic circuitry be developed which would take large quantities of hardware and space requirements on printed circuit cards such that sometimes four or five extra logic cards were needed in order to complete a particular line control processor. Soon the cost and space requirements of these developments became prohibitive and better means were required for handling the variety of functions required of a line control processor.

In this situation a microprocessor-controller was developed which could handle all the basic logic for any variety of peripheral terminal units and which could be built with a minimum amount of components and placed on a single printed circuit card. This device was designated as the universal input/output state machine or UIO-SM. Thus, the UIO state machine could be built typically on a 112 chip circuit board and be placed within the slide-in card rack which is supported by the LCP base module (now called UIO base module). The UIO state machine can interface easily to any application dependent logic through its front plane and, except for power connections and clock connections, no connections needed to be made to the LCP or UIO base backplane. The universal I/O state machine is basically implemented in transistor type logic (TTL).

General Overview of the Universal I/O State Machine

The UIO-SM has been made to implement a useful group of general purpose operators which include:
Arithmetic OP's
Logical OP's
Read/Write Memory OP's
PUT/GET OP's
Program Stack OP's (Branch, Call and Return)

Figures 2, 4B:
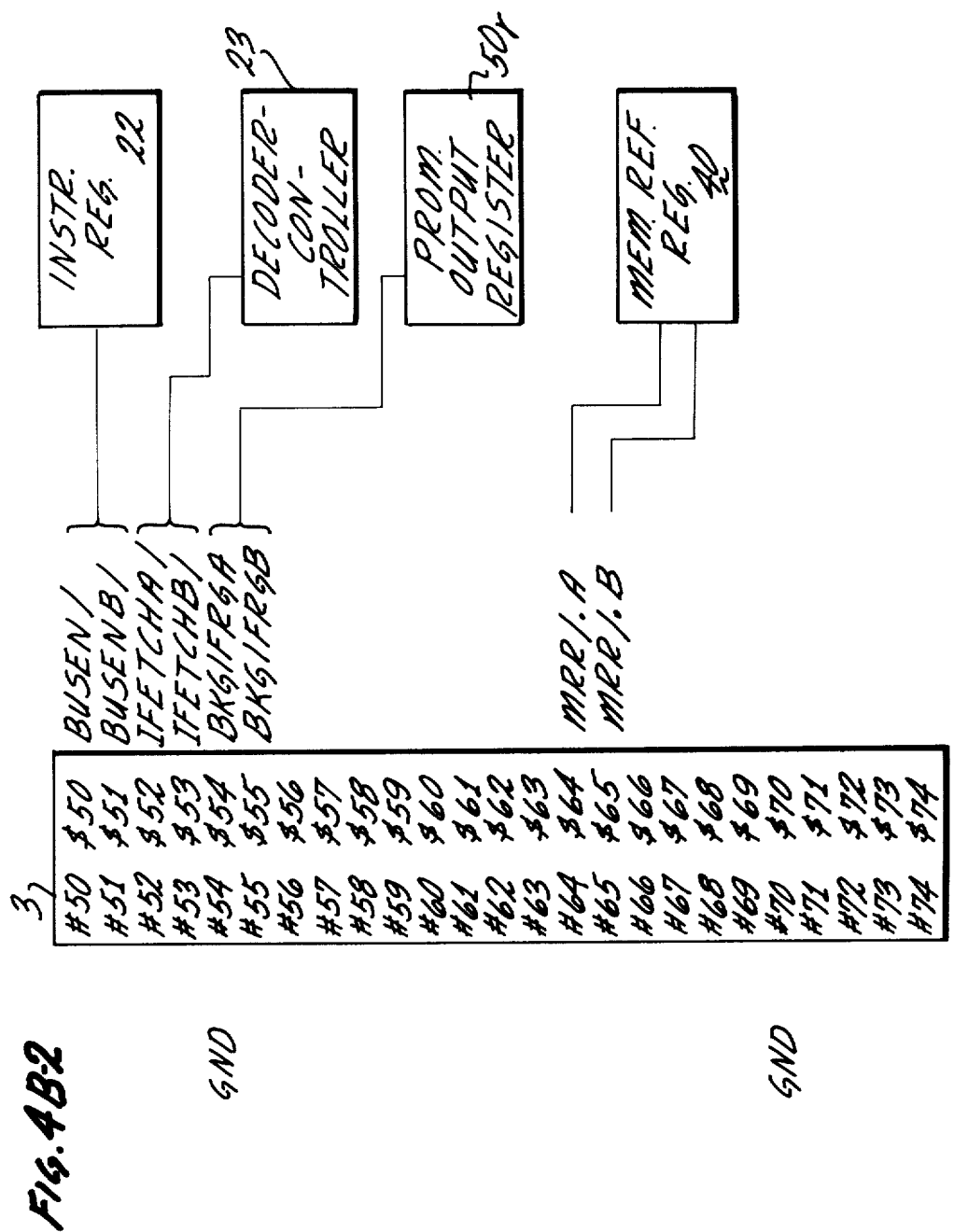
FIG. 2 is a diagram of the elements of the universal input-output microprocessor state machine and its communication lines to the application dependent logic module.

At FIG. 2 there is seen an overall block diagram of the UIO state machine. The input/output lines at the bottom of the drawing are all front plane lines which connect to the peripheral's application dependent control (PDC) logic since it is desired that the UIO state machine itself be independent of any application type logic or of the special requirements of particular peripheral units.

Referring to the state machine block diagram of FIG. 2, there will be seen a series of interconnecting lines 16, $17_1$, $17_2$, 18, 10, 19, 11, 12 and 20, which connect to the application dependent logic $60_L$. These lines are labeled, such as the external memory data output bus 12, the I/O and memory write parity line 18, the memory address bus 16, the memory write enable 19 (and other functions listed on FIG. 2), the direct memory access (DMA) request line 11 (and other functions on FIG. 2), in addition to the main I/O bus 10. Line 15 is the instruction output bus from the program PROM 50.

A program counter 41, having input lines from stack memory 45 and I/O bus 10, via $10_f$, provides an output line which feeds an input signal to the program PROM 50 (internal memory 50). A memory reference register 40 (MRR) receives its input signals via I/O bus 10 from accumulator registers 30, memory operand 31, and the save-MRR 47 (memory reference registersave). Repetition counter 42 also receives an input line via I/O bus 10 for signals from accumulator registers 30 and memory operand 31.

The stack memory 45, controlled by stack pointer 46, provides an output line to the program counter 41. The repetition counter 42 provides an output which feeds back around line $10_f$ over to the I/O bus 10 and also around to the accumulator registers 30.

Attached and receiving input from the I/O bus 10 is a control register 1 designated as item 37, a control register 2 designated as item 38 and a parity register 39. The control registers 37, 38 provide buffering of signals to application control register lines $17_1$, $17_2$. The parity generator 39 has an output line 18 (part of I/O bus 10) and provides "I/O and memory write" parity.

The memory output data bus 12 from RAM external memory 90 connects to the memory operand register 31 whose outputs feed to ALU 32 and parity check circuitry 21 which has an output line 20 to provide memory read parity to external memory 90. Data bus 12 also provides an input to the instruction register 22 which has an output line connecting to the input of the instruction decoder-controller 23. Situated within instruction decoder-controller 23 are external flag registers $23_e$, interrupt mask $23_i$, and state counter $23_s$.

Accumulator registers 30 actually comprise two sets of eight registers, one set designated $30_f$ (foreground accumulator registers) and the other set as $30_b$ (background). Each of the 16 registers are addressed and selected by an address line $23_a$ from the instruction decoder-controller 23.

The I/O bus 10 provides a channel to the accumulator registers 30 which have an output to the B input of the arithmetic logic unit 32. Another input A to the arithmetic logic unit 32 comes from the memory operand register 31 which gets its input from external memory via the memory output 12, or from internal memory via bus 15.

The arithmetic logic unit 32 (ALU) has one set of outputs which feed to the "foreground" flag register 35 and another set of outputs to the "background" flag register 36. These flag registers 35 and 36 form an output which is fed to the instruction decoder-controller 23. They are used to signal "foreground mode" conditions for normal operation and "background mode" conditions for interrupts or emergency operation.

The F output of the arithmetic logic unit 32 feeds on a bus 10; to the shift logic circuitry 33 and to the byte-swap circuitry 34. The outputs of these circuits 33, 34 connect to the I/O bus 10.

Summary: General Operation

The PUT OP (operator) writes a 16-bit word (two bytes symbolized as AB) from the I/O bus 10 into a selected application dependent register 60 (external register), the particular register being addressed via GET-PUT address lines 19. The PUT OP can address any one of 32 application dependent registers. The GET OP reads a 16-bit word from a selected application dependent register 60 into an accumulator register 30 on the UIO-SM or into RAM memory 90 through the I/O bus 10. The GET OP can also address a selected one of the 32 application dependent registers 60.

The UIO-SM has the ability to repeat certain OP's (PUT's, GET's and logical OP's) by loading a number N (from the software) into a repetition counter 42 to control the memory reference register (MRR) 40 which is used as a counter after having been loaded with the starting address of the data block to be used in the "repeated" OP.

In order to hold "PUT Data" for a longer period of time than can occur directly off of I/O bus 10, there are two 8-bit registers (control registers 37, 38) which have been placed in the UIO-SM. The strobing of these registers 37, 38 is under the control of the application dependent logic 60$_L$ (FIG. 2).

A "WAIT line" (on bus 11) has been built into the UIO-SM such that when an external "slow memory" is addressed, the "slow memory" can force the UIO-SM to wait however long required for the Read or the Write to be valid. This is seen on FIG. 2 at bus 11 which feeds signals to the instruction decoder-controller 23. This line can also be used to halt the machine. A clock enable line on bus 11 (CLKENB) has been included so that the application dependent logic 60$_L$ may control the state machine clock for single pulse operations and also direct memory access (DMA) operations. The timing for this signal is the same as the WAIT signal on bus 11.

As seen in the state machine diagram of FIG. 2, the UIO-SM can check via circuitry 21 for odd parity on each memory fetch. All memory fetches from external memory 90 come on the memory output data bus which is shown as bus 12 and which connects to instruction register 22 and to the memory operand register 31. All memory writes go out on the I/O bus 10 along with odd parity on line 18. The UIO-SM contains 8-K words of user-defined instruction programs in PROM 50 which is capable of being expanded to 64-K words.

With reference to FIG. 3, it will be seen that memory is used (at certain times specified in instruction words) to address RAM data memory 90 which will provide programs applicable to the peripheral device connecting to the application dependent logic module 60$_L$. This external memory 90 also serves to store data which is being transferred between the host computer and their peripheral terminal device. Since memory 90 and 50 are organized two bytes wide (16-bits plus parity) but the data for transfer is sometimes required in single byte form, as for peripherals such as card readers, the memory reference register (MRR) 40 has been designed such that only the high order 15-bits are used to address memory 90. The low order bit (BYTESWP) is used by the byte-oriented read/write OP's to determine whether or not to byte-swap the two byte data word before storage into accumulator registers 30 on a "external data memory read" or before storage into external RAM data memory 90 on a "data memory write". This particular feature permits the UIO-SM to easily handle byte-oriented data in that the desired byte is automatically read into the "low order" byte position of the accumulator registers 30 on "data memory reads", as well as being automatically written from the "low order" byte position into the correct byte position on "data memory writes". The "high order" byte position of the accumulator registers 30 must contain the last byte written, if any is present.

In Table I there is shown the instruction format for the UIO-state machine operators. The external memory output data bus 12 provides 17 bits designated 0-16. The bus bits 0-7 (low order) constitute the "B" byte while the bus bits 8-15 constitute the "A" byte (high order).

TABLE I

INSTRUCTION FORMAT FOR UIO-STATE MACHINE OPERATORS

| Field | Field Specifier | Bus Bit on Instruction Bus 15 and Memory Data Bus 12 |
|---|---|---|
| Odd Parity | P | 16 |
| Basic Function | F1 | 15 |
|  | F0 | 14 |
| Function Variant | V4 | 13 |
|  | V3 | 12 |
|  | V2 | 11 |
|  | V1 | 10 |
|  | V0 | 9 |
| Destination Specifier | D3 | 8 |
| (or Misc. Control) | D2 | 7 |
|  | D1 | 5 |
|  | D0 | 5 |
| Source Accumulator | S2 | 4 |
|  | S1 | 3 |
|  | S0 | 2 |
| Memory Address Source For Operand of Instruction | M | 1 |
| Copy ALU Output to Memory Reference Register | C | 0 |

Bus Bit 15 - 8 = "A" Byte
Bus Bit 7 - 0 = "B" Byte

| F Field | V Field | D Field | S Field | | |
|---|---|---|---|---|---|
| P \| F1 \| F0 | V4 \| V3 \| V2 \| V1 \| V0 | D3 \| D2 \| D1 \| D0 | S2 \| S1 \| S0 | M | C |
| 16 \| 15 \| 14 | 13 \| 12 \| 11 \| 10 \| 9 | 8 \| 7 \| 6 \| 5 | 4 \| 3 \| 2 | 1 | 0 |
| A Byte | | | B Byte | | | addresses can come from two sources—the program counter 41 and the memory reference register (MRR) 40. The UIO-SM provides the ability to do conditional and unconditional Branches, Calls and Returns. "Calls" can be nested up to 16 levels from stack memory 45. The memory reference register 40 stores addresses and As will be seen from Table I certain fields are specified such as the P field for odd parity, the basic function field F1, F0, and function variant field by V4-V0. The destination specifier field is designated D3-D0; the source accumulator field is designated S2, S1, S0. The field which causes selection of the memory address source to be used in fetching the instruction is designated M; while the function field for copying the arithmetic logic unit output into the memory reference register 40 is designated by the field C.

The odd parity bit is set such that an odd number of 1's will exist across the entire 17-bit instruction (or the operand). The basic function field F1, F0 is described in Table II such that various binary digit combinations of F1, F0 provide certain functions as shown.

TABLE II

BASIC FUNCTION

| F1 | F0 | Function |
|---|---|---|
| 0 | 0 | Contents of External Register to Accumulator or external RAM Memory (GET) |
| 0 | 1 | Contents of Accumulator or external RAM Memory to External Register (PUT) |
| 1 | 0 | ALU Operators |
| 1 | 1 | Program Stack Operators (Branch, Call, Return) |

For example, the GET function provides for the transfer of the contents of an external register 60 to the accumulator 30 or to RAM memory 90. The digital bits 0, 1 provide for the transfer of the contents of an addressed register in accumulator 30 (or an addressed portion of external RAM memory 90) to the external registers 60. This is called the PUT function. The F field bits 1, 0 provide for execution of the arithmetic logic unit operators; while bits 1, 1 provide for the functions of the program stack (45) operators such as Branch, Call, Return.

Table III shows the function variant field V4-V0 and its relation to the function field F1, F0.

TABLE III

FUNCTION VARIANT

| F1 | F0 | V4 V3 V2 V1 V0 | Field Description |
|---|---|---|---|
| 0 | 0 | [R(N)] | External Register Address (GET) |
| 0 | 1 | [R(N)] | External Register Address (PUT) |
| 1 | 0 | [ALU OP] | ALU Op Code |
| 1 | 1 | [(OP) (TEST)] | Program Stack Op Code and Condition Test Specifier (Conditions from Flag Register) (ICall & IRet are Unconditional Operators) OP = 00 IRet OP = 01 Call OP = 10 Branch OP = 11 Return or ICall Test = 000 Unconditional Test = 001 ALU = 0 Test = 010 ALU = MSB = 0 Test = 011 ALU Carry = 1 Test = 100 ALU LSB = 0 Test = 101 External Flag 1 = 1 Test = 110 External Flag 2 = 1 Test = 111 External Flag 3 = 1 |

Note:
The Program Stack OP's can Execute on Condition Test True or Not True depending on the Destination Specifier. IRet and ICall execute Unconditionally.

For example, the F-bits 0, 0 specify a GET operation from an external register address while the F-bits 0, 1 specify a PUT operation into an external register of a specified address.

Table IV shows the destination specifier field, D3, D2, D1, D0.

TABLE IV

DESTINATION SPECIFIER (OR MISC. CONTROL)

| D3 | D2 | D1 | D0 | Destination (Or Misc. Control) |
|---|---|---|---|---|
| | | | | (i) GET and ALU OP's |
| 0 | 0 | 0 | 1 | Null, No Destination - Used to Update Flag Register only (ALU Op's Only) |
| 0 | X | X | 0 | Write RAM Memory (GET and ALU Op'2) |
| 1 | [A(D)] | | | Destination Accumulator A(D) (GET and ALU Op's) can be same as Source Accumulator A(S) |
| | | | | (ii) PUT and Program Stack Op's |
| S | X | F | F | S = 0 Operand Source from Memory (PUT and Program Stack Op's) |
| | | | | S = 1 Operand Source from Source Accumulator A(S) (PUT and Program Stack Op's) |
| | | | | FF = 00 Application Dependent Strobe No. 1 (PUT Op) |
| | | | | FF = 01 Application Dependent Strobe No. 2 (PUT Op) Execute on Condition Test True (Program Stack Op) |
| | | | | FF = 10 Application Dependent Strobe No. 3 (PUT Op) Execute on Condition Test Not True (Program Stack Op) |
| | | | | FF = 11 Load Repetition Count Register (Repeat Register 42) (PUT Op) |

X = Don't Care

This D3-D0 field is subdivided into (i) GET and ALU OP's and (ii) PUT and program stack OP's. In the case of (i) there may be no destination specified; or only a miscellaneous control field may be used to update the flag register; or the destination may be the RAM memory 90.

In the case (ii) for the destination field, the operand source may come from RAM memory 90; or the operand source may be from the source accumulator 30; or the destination may be a load into the repetition counter 42.

The Source Accumulator Field S2, S1, S0 is shown in Table V below:

TABLE V

SOURCE ACCUMULATOR A(S) FIELD
S2, S1, S0

| (i) | ALU or PUT | |
|---|---|---|
| | [A(S)] | Operand from Source Accumulator A(S) [can be same as Destination Accumulator A(D)] |
| (ii) | GET | |
| | S = XX0 | Application Register 60 is Source |
| | S = XX1 | Repetition Counter 42 is Source |
| (iii) | Program Stack OP's | |
| | V = 11CCC & S = XX0 | Return Operator |
| | V = 11XXX & S = XX1 | ICall Operator (Forced by Interrupt Hardware) |

The source accumulator field specified as S2, S1, S0 (Table V) may apply (i) to the ALU or the PUT Op where the operand from the source accumulator A(S) can be the same as the destination accumulator A(D); or (ii) where the GET Op can function so that the source is an external application register 60 or that the source is the repetition counter 42; or wherein (iii) the program stack Op's can provide a return operator or an IC all operator.

M Field Specifier; Selecting Memory Address Source for the Operand of and Instruction:

The M field specifier (as originally noted in Table I) may occur as one of two binary states, that is as a 0 or as a 1. When M is 0, then the operand for this instruction is located one address beyond this instruction (PC+1, program counter plus 1) or there is no operand. If the instruction does not require a memory operand, then PC+1 is not used for an operand; the next "instruction" will be at PC+1 (no space is allowed for an operand). The operators that do not use an operand are listed as follows:

1. All "GET" operators;
2. "PUT" operators with D3=1;
3. "CALL" or "BRANCH" with D3=1;
4. ICALL, RETURN, IRETURN, ROTR, SHFL, SHFR, CMA, ONES, ZEROS, SWAC, WRTW, WRTB, DRTL, EI, DI and RSTK Operators. (These operators are discussed subsequently hereinafter).

When the M field bits is "1", then the operand for this instruction is addressed by the memory reference register 40 (MRR) or else there is no memory operand for this instruction.

C Field; for Copying ALU Output to the Memory Reference Register 40:

The C field originally shown in Table I may read as a 1 bit or a 0 bit. In the 1 bit situation this means that the machine will not copy the ALU output to the memory reference register 40; however, if the bit is "0", then the ALU output will be copied on to the memory reference register 40. The C bit can be set to 0 on all instructions except GET's and RDB, RDBW, RBWR, SWAC and WRTB. These operators are discussed subsequently hereinafter.

Flag Registers:

Two flag registers are provided so that at least one flag register is fully available for each of the two operating modes. Thus, flag register 35 is the "foreground mode" flag used under normal operating conditions while register 36 is the "background mode" flag which is used during interrupt or other unusual conditions. As seen in FIG. 2, flag registers 35, 36 receive output from the arithmetic logic unit 32 and provide an output line to feed input to the instruction decodercontroller 23. The flag register is updated at the end of all ALU operators (which include arithmetic OP's, logical OP's and load/store/move OP's). On OP's which "byte swap" the ALU 32 output before storage into the destination location, the flag register is updated on the basis of the full two bytes of information from the ALU 32 after being swapped. In the specific cases of REBW OP (read before write byte) and the RBWR OP (read before write byte reversed), a full memory word is read into the UIO state machine, but only one of the two bytes read is written into accumulator register 30 (the low order byte of the accumulator destination register remains unchanged). The flag registers (35,36) are updated on the basis of the full word read from RAM memory 90.

As indicated in FIG. 2, the accumulator registers 30 actually constitute two different sets of eight registers. One set 30$_f$ of accumulator registers is for normal operating conditions (foreground mode) while the other set 30$_b$ of eight accumulator registers is for abnormal conditions (background mode) as during interrupts.

Instruction Repetition:

The use of the repetition counter 42 provides an instruction repetition feature where a PUT or a GET OP may be repeated up to 256 times by the use of a PUT OP to load the repetition counter 42 which must be followed by the PUT or the GET OP to be repeated. Any value N from 0 to 256 (from the software) may be loaded into the repetition counter 42 and N+1 operations will be performed (1 to 256). The address source for the repeated PUT data or the address destination for the repeated GET data is found in MRR 40 and thus these addresses will originate from the memory reference register 40 and not from the program counter 41 (PC+1). In other words, the M-bit is set to "1" in the repeated PUT or GET OP's. After each PUT or GET, the hardware will increment the MRR 40 in preparation for the next PUT or GET. When repeated, each individual PUT or GET will execute in one clock period, unless the PUT or the GET addresses a "slow memory", in which case there will be one extra clock period at the beginning of the repeated PUT's or at the end of the repeated GET's.

The use of the repeated PUT's or GET's serves to greatly increase code compaction while also greatly increasing the speed of the clock transfers to or from RAM memory 90.

Any logical OP (AND, CMA, CMM, OR, XOR, ONES, ZERO, ADDC, SUBC, etc. as described hereinafter) may be repeated up to 256 times by the use of a PUT OP to load the repetition counter 42 which must be followed by the logical OP to be repeated. Any value of N from 0 to 255 may be loaded into the repetition counter 42 and N+1 operations will be performed (1 to 256). For the repeated OP to work as expected, the souce accumulator 30 should be equal to the destination accumulator 30. The address source for the operand data should originate from the memory reference register 40 (MRR) just as for the repeated PUT or GET. After each OP of the repeat sequence is executed, the hardware will increment MRR 40 in preparation for the next OP. When repeated, each individual logical OP will execute in one clock period, unless the operands are located in a "slow memory".

One particular case, where a repeated logical OP can increase code compaction and execution speed, is the use of the repeated "Exclusive OR" for the purpose of generating longitudinal parity on a data block located in external memory 90.

The PUT OP which loads the repetition counter 42 must have the N valve in the "B" byte (low order 8-bits) of the PUT data. The "A" byte (high order 8-bits) is a "don't care".

The application dependent logic 60$_L$ has the capability of stopping instruction repetition even though the full number of operations has not occurred.

The capability exists to do repeat operations with PC (program counter 41) used for the memory operand source address (M-bit equal to 0). In this case, PC 41 will increment during the repeat operation instead of MRR 40 (provided that the operator does use a memory operand). Using PC 41 during the repeated operations will allow the use of a multiple word literal following the single repeated operator. The size of the "literal" field must be exactly the number of words specified by the repeat count value plus 1 word. The HLT REP/interface line (half repetition) must remain "high" during all repeat operations using PC 41 as an address source for operand data.

In regard to the instruction execution speed, the basic clock rate for the UIO-SM is 8 MHZ (125 nanosecond clock period). All OP's, with the exception of the program stack operators, execute in two clock periods except such OP's that write from the UIO-SM accumulators 30 into RAM memory 90 (3 clocks required) or have operands to be fetched from or stored into "slow memory" (three or more clocks required). The program stack operators require 3 clocks periods to execute if the condition is true (Branch or Call "executed") and only require 2 clock periods of the condition is false (Branch or Call "not executed"). The NO-OP executes in 2 clock periods. The OP IReturn executes in 3 clock periods, while Load and Store Accumulator executes in 4 clock periods.

The execution of any given instruction requires an "instruction fetch" along with the above-noted execution cycles; however, in the case of the UIO-SM, the instruction fetch for the next instruction is performed during the last execute cycle of the current instruction. Therefore, the "instruction fetch" is masked from the timing.

The NO-OP:

The NO-OP consists of any program stack operator (such as Branch) with the condition test field set to "UNCONDITIONAL" and the destination specifier set to "EXECUTE ON CONDITION TEST NOT TRUE" (Branch never). Whether or not the NO-OP occupies one or occupies two memory locations, is a function of whether or not the operand (Branch never address) is placed next to the instruction (PC+1) or is addressed by the memory reference register 40 or comes from an accumulator 30. The flag registers 35, 36 will not be updates on the NO-OP.

Clear Sequence:

The clear sequence is a "zeroing" operation. When a "Clear" is issued to the UIO-SM, the program counter 41, the repetition counter 42, and the stack pointer 46 are reset to zero and an instruction is fetched. After a "Power-up Clear" has been issued, the accumulators 30 cannot be predicted. However, if a "Clear" is issued while power remains up, the accumulator registers 30 will retain their states just previous to the "Clear". While "Clear" is true, at least two clocks must be issued; after "Clear" has gone false, one clock is required before execution of the first instruction begins.

Output Control Registers:

There are two output control registers 37 and 38 in the UIO-SM as seen in FIG. 2. These can be used by the application dependent logic $60_L$ to hold "PUT Data" for a longer period of time than can normally occur directly off of the I/O bus 10. Both output control registers 37 and 38 are 8-bits wide and have their data inputs connected to the low order 8 bits of the I/O bus 10 ("B" byte). Both of these output control registers must be clocked by the application dependent logic $60_L$. FIG. 5 illustrates a preferred method for clocking the output control registers 37 and 38. A triple input NAND gate 74 in FIG. 5 has three input line signals: PUT STROBEsignal; address signals for an external register (60 of FIG. 2); and the clock signal. These signals are correlated in FIG. 5.

Once clocked by a leading edge, the outputs of these registers will stabilize in 17 nanoseconds or less. A Schottky TTL NAND device 74 is used for the control register clock generator since the "PUT Data" can be guaranteed for only 10 nanoseconds past the leading edge of CLOCK as received on the UIO-SM, and the output control registers require a data hold time of 2 nanoseconds minimum past the leading edge of their clock.

Memory Addressing and Expansion

In the preferred embodiment and without expansion of memory, the UIO-SM has the capability of directly addressing 0 to 64 K words of program memory 50, FIG. 2, and from 0 to 32 K words of data memory in RAM 90. To facilitate any further expansion of memory, such as by using paging techniques or otherwise, the enabling of the program PROM 50 in the UIO-SM can be controlled by an expanded memory in the application dependent logic $60_L$.

FIG. 6 illustrates how such an expanded memory can control the enabling of the UIO-SM program PROM 50 through the use of a front-plane external signal. If the expanded memory drives this signal to a "high" level, the UIO-SM program PROM 50 will be disabled. If the application dependent logic $60_L$ does not have a requirement for expanded memory, then it will simply tie this line to a logic "low". In FIG. 6, a 5-input NOR gate 75 has inputs from program counter 41 in order to provide a parity disable signal (high ) to disable PROM 50.

The UIO-SM program PROM 50 may be expanded from 8 K up to 64 K words by using different size PROMs. The chip select and the addressing functions of the PROM 50 are automatically adjusted without circuit changes. A jumper arrangement is used to enable the parity bit output for the size of the program memory being used. With reference to FIG. 6, jumpers can be installed according to the following Table VI for each word size of PROM shown below.

TABLE VI

| | |
|---|---|
| 8K PROM - | A15 to MADR 15 |
| | A14 to MADR 14 |
| | A13 to MADR 13 |
| 16K PROM - | A15 to MADR 15 |
| | A14 to MADR 14 |
| | A13 to GND |
| 32K PROM - | A15 to MADR 15 |
| | A14 to GND |
| | A13 to GND |
| 64K PROM - | A15 to GND |
| | A14 to GND |
| | A13 to GND |

The UIO-SM receives its clock signal from the backplane of the UIO base module. To receive clock signals, the UIO-SM preferably uses Schottky type flip-flops followed by Schottky type inverters in order to generate the internal UIO-SM clock (CLOCK). All the timings are relative to this internal clock which preferably has a minimum delay of four nanoseconds and a maximum delay of 13 nanoseconds from the clock on the backplane. In order to insure minimum clock skew between the application logic $60_L$ and the UIO-SM, the application logic $60_L$ is preferably made to use the same type of devices to receive and distribute the clock.

The following paragraphs will illustrate detailed timing and explanation for the interface between the UIO-SM and the application dependent logic $60_L$.

Referring to FIG. 7, which is entitled "Clear Line Timing", it will be seen that in order to initialize the UIO-SM, the CLEAR line must be "true" (active low) for at least two full clock periods.

Another feature implemented into the UIO-SM is the WAIT line (WAIT/). This is used such that when "slow memory" is addressed, the slow memory can force the UIO-SM to wait however long required for the "read" or the "write" to be valid. This line can also be used to halt the machine for any length of time required. The timing requirements for the WAIT/line are illustrated in FIG. 8. Since this line has multiple sources, including one line on the UIO-SM itself, it must be driven by an open-collector (TTL device).

A CLOCK enable (CLOCKENB) line is implemented on the UIO-SM for use in single pulse or for direct memory access (DMA) functions. The timing here is the same as the WAIT/of FIG. 8.

GET/PUT Timings

The timing relationships for the non-repeated GET's and PUT's are illustrated in FIG. 9. The WAIT line can be used on the GET to increase the memory write time in the case of a "slow" write memory. Another application for use of the WAIT line on GET's is to increase the amount of time available for the application dependent logic $60_L$ to drive the "GET DATA" and meet set-up times after having received the GET enable signal.

In the case of the PUT OP, the effect of the WAIT line is to increase the period of time that "PUT DATA" is on the I/O bus 10, although the UIO-SM would be halted during this time. It should also be noted that the timing of the PUT Strobe can only be guaranteed relative to the CLOCK signal and not relative to the PUT DATA. As such, neither edge of the PUT Strobe is used to directly clock the PUT Data into an application dependent register 60.

The first transfer of data in a "repeated" GET to an addressed register in accumulator 30 will be invalid. All data transfers (after the first) will be valid. The same accumulator register 30 is addressed as a "destination" for each repeat GET operation.

If M=1 (refer to Table I), the memory reference register 40 will be incremented during each repeat GET operation, even though external RAM memory 90 is not used by the GET operator.

The timing relationships for repeated GET's and repeated PUT's are shown in FIG. 10. Specifically this timing chart further illustrates when repeated "GET Data" can change and when repeated "PUT Data" will also change.

The timing relationships for memory "Reads" in the UIO-SM are shown in FIG. 11. The WAIT line has been utilized on one of the memory reads to illustrate how one (or more) extra clock periods can be inserted after address stabilization to allow "slow access" memory to meet the setup time requirements of the UIO-SM.

In regard to the memory "Write" timings for the UIO-SM, these memory Writes are shown in FIG. 12. UIO-SM instructions which can do memory Writes are: WRTW (Write Word), WRTB (Write Byte), and also GET. The WAIT line 11 has been utilized on one of the memory Writes to illustrate how one (or more) extra clock periods can be inserted after address stabilization in order to allow "slow" Write memory an adequate Write time.

Halting "Repeated" Instructions

Although the total number of operations on a repeated instruction may not be completed, the repeated instruction itself can be halted by the application dependent logic $60_L$. The application dependent logic produces the signal HLTREP/(active low), which is the signal to the UIO-SM that halts the repetition. In FIG. 13 there is shown the timing of this signal. If the application dependent logic $60_L$ has no requirement for halting repeated instructions, then the application dependent logic can simply leave the HLTREP/signal unconnected.

When the HLTREP signal goes false, the current processing operation will be completed and a fetch of the next instruction is started at the "high" clock transition. The HLTREP/line must remain "high" during repeat operations using the program counter (PC) 41 to address the memory operands (M bit=0).

Parity Error Line

On every memory fetch the UIO-SM checks for odd parity and signals the reults to the application dependent logic $60_L$. If incorrect parity is detected, the UIO-SM takes no action other than to signal the error to the application dependent logic $60_L$. This timing of the parity error line PARERR/is shown in FIG. 14.

Referring to FIG. 3 and to the memory reference register 40 (MRR) there is a line which is used by external memory mapping logic to control address bit 15 of the memory reference register 40. This line is designated as MRR 15 and the state of this line is loaded into MRR 40 at bit 15 whenever a loading of memory reference register 40 is called for by a UIO-SM instruction. The state of this line should be stable for at least 30 nanoseconds prior to the high transition of the clock to ensure that it can be properly loaded. This line is tied to ground (low side) if memory mapping is not used.

There is a line designated IRQ/on bus 11 which line is the "interrupt request line". This line is driven "low" preferably by an open-collector device in order to request an interrupt of the UIO-SM. The UIO-SM will only recognize an interrupt request if the interrupt mask is reset (EI instruction executed, Table XII-F, for resetting the interrupt mask bit) and an instruction fetch has just been completed when not in repeat mode (high clock transition at end of T0 and the start of T1).

The UIO-SM responds to an interrupt by forcing execution of an ICALL instruction and switching the UIO-SM "background" mode "on". The ICALL instruction generates an acknowledge signal (ACKI/) in order to allow the application logic $60_L$ to place an interrupt call address on the I/O bus 10. The ICALL instruction saves the memory reference register 40 data in the MRR save register 47 and it saves the old PC (program counter) value on the stack before loading PC with the call address (placed on the I/O bus 10 by the application logic $60_L$). Further interrupts are inhibited in the "background" mode and the duplicate set of flags (35) and accumulators ($30_f$) are used so that the "foreground" operating environment is preserved therein.

A return to the "foreground" mode is accomplished by executing an IRET instruction. The top value from the stack memory 45 is placed in the program counter PC 41 for the return address and the contents of the MRR save register 47 is placed into the memory reference register MRR 40. The original foreground flag 35 and foreground accumulator $30_f$ are again made active and contain the same values as before the interrupt. The clear line will place the UIO-SM in the "foreground" mode and set the interrupt mask to disable interrupts. The IRQ/line must be stable at least 60 nanoseconds before the leading edge (high transition) of the clock signal.

The DNA request line 11 of FIG. 3 is a line which is driven "low" by the application dependent logic $60_L$ in order to isolate the UIO-SM address outputs on memory address bus line 16 so that direct memory access (DMA) logic can drive this bus. This line is left unconnected when not using the DMA.

The bus enable line (BUSEN/LINE) from Control Logic 66 is driven "low" by the application logic 60$_L$ in order to enable the I/O bus drivers on I/O bus 10, including data, GETENB, PUTSTB and REGADR signals. The GETENB is a signal used to indicate that GET data is driven on to the I/O bus 10; the PUTSTB is the signal used to indicate that PUT data is on the I/O bus 10; the REGADR signal is the signal used to indicate the enabling of the external register address lines for GET's and PUT's. When "high", this line disables all I/O signals. This line is tied to "low" if it is not used.

Universal Input/Output State Machine Front Plane Interface

The front plane connectors (FIG. 4A, FIG. 4B-1, 4B-2) which provide the interface for the UIO-SM are preferably four in number wherein each of the four front plane connectors provides 25 pin connections on each of two sides of each front plane connector. The following Tables VII–X show the signal name for each pin number for each side of the four front plane connectors.

TABLE VII (Connector No 1) (see FIG. 4B-1)

| PIN Number | $ SIDE* SIGNAL NAME | # SIDE* SIGNAL NAME |
|---|---|---|
| 00 | MADDR15 | MADDR14 |
| 01 | MADDR13 | MADDR12 |
| 02 | MADDR11 | MADDR10 |
| 03 | MADDR09 | MADDR08 |
| 04 | MADDR07 | GND |
| 05 | MADDR06 | MADDR05 |
| 06 | MADDR04 | MADDR03 |
| 07 | MADDR02 | MADDR01 |
| 08 | MADDR00 | MRR15 |
| 09 | BUSREQ/ | GETSTB |
| 10 | IRQ/ | PROMENB/ |
| 11 | IOBUS15 | IOBUS14 |
| 12 | IOBUS13 | IOBUS12 |
| 13 | IOBUS11 | IOBUS10 |
| 14 | IOBUS09 | IOBUS08 |
| 15 | IOBUS07 | IOBUS06 |
| 16 | IOBUS05 | IOBUS04 |
| 17 | IOBUS03 | IOBUS02 |
| 18 | IOBUS01 | IOBUS00 |
| 19 | IOBUSP AR | REGADDR4 |
| 20 | REGADDR3 | GND |
| 21 | REGADDR2 | REGADDR1 |
| 22 | REGADDR0 | FLAG3/ |
| 23 | FLAG2/ | FLAG1/ |
| 24 | HALTREP/ | ACKI/ |

*Note: One side of connector is designated $ while the other side is designated #.

TABLE VIII (Connector No. 2) (see FIG. 4B-1)

| PIN NUMBER | $ SIDE SIGNAL NAME | # SIDE SIGNAL NAME |
|---|---|---|
| 25 | MEMOUT15 | MEMOUT14 |
| 26 | MEMOUT13 | MEMOUT12 |
| 27 | MEMOUT11 | MEMOUT10 |
| 28 | MEMOUT09 | MEMOUT08 |
| 29 | MEMOUT07 | GND |
| 30 | MEMOUT06 | MEMOUT05 |
| 31 | MEMOUT04 | MEMOUT03 |
| 32 | MEMOUT02 | MEMOUT01 |
| 33 | MEMOUT00 | MEMOUTPA |
| 34 | OCREG107 | OCREG106 |
| 35 | OCREG105 | OCREG104 |
| 36 | OCREG103 | OCREG102 |
| 37 | OCREG101 | OCREG100 |
| 38 | OCREG207 | OCREG206 |
| 39 | OCREG205 | OCREG204 |
| 40 | OCREG203 | OCREG202 |
| 41 | OCREG201 | OCREG200 |
| 42 | OCREG1CK | OCREG2CK |
| 43 | RAMRD/ | PUTSTB3/ |
| 44 | PUTSTB2/ | PUTSTB1/ |
| 45 | CLKEN | GND |
| 46 | unused | WAIT/ |
| 47 | unused | CLEAR/ |
| 48 | RAMWE/ | unused |
| 49 | GETENB/ | PARRERR/ |

TABLE IX (Connector No. 3) (see FIG. 4B-2)

| PIN NUMBER | $ SIDE SIGNAL NAME | # SIDE SIGNAL NAME |
|---|---|---|
| 50 | BUSEN/ | |
| 51 | BUSEN/ | |
| 52 | IFETCH/ | |
| 53 | IFETCH/ | |
| 54 | BKG/FRG | |
| 55 | BKG/FRG | |

Note:
FIGS. 4B-1 and 4B-2 show in more detail the connectors 1, 2, 3, 4 of FIG. 4A. In addition to the microprocessor system elements shown in FIG. 2, FIG. 4B-1 indicates the connections to the PROM output registers 50, and sub-elements of the instruction decoder-controller such as the repeat-mode flip-flop 42, and foreground-background flip-flop 35$_f$.
FIG. 4B-2 shows further connections to the microprocessor system and includes a condition test register 23$_r$.

TABLE X (Connector No. 4) (see FIG. 4B-2)

| PIN NUMBER | $ SIDE SIGNAL NAME | # SIDE SIGNAL NAME |
|---|---|---|
| 75 | MROEB/ | MNTENB/ |
| 76 | SC1B | SC2B |
| 77 | SC1B | SC8 |
| 78 | STKOVF/ | |
| 79 | SMOE/ | GND |
| 80 | BSAEOX/ | BSBOEX/ |
| 81 | SHAOEX | SHBOEX |
| 82 | MRSVOEX | RCOEX |
| 83 | | IIOAOEX/ |
| 84 | FCLD/ | MRLD/ |
| 85 | MOPND/ | REPEATB |
| 86 | INVOP | COND/ |
| 87 | ACWRITE/ | ACBWE/ |
| 88 | SMWEX/ | STAK0 |
| 89 | STKA1 | STKA2 |
| 90 | STKA3 | ENREP/ |
| 91 | BYTSWP B | SCSOX |
| 92 | SCSIX | ALUMDX |
| 93 | ALUS3X | ALUS2X/ |
| 94 | ALUS1X | ALUS0X |
| 95 | D3B | GND |
| 96 | F0B | F1B |
| 97 | ACADR0 | ACADR1 |
| 98 | ACADR2 | S0B |
| 99 | S1 | S2 |

Table XI is a glossary of the front plane signal names for the Universal I/O State Machine. This glossary shows the signal name, the number of the front plane connector involved, when the signal is a Fan-in or a Fan-out signal and, in addition, a functional description of the signal involved.

TABLE XI

GLOSSARY OF UIOSM FRONTPLANE SIGNAL NAMES

| SIGNAL NAME | CONNECTOR NUMBER | FAN-IN/ FAN-OUT* | DESCRIPTION |
|---|---|---|---|
| 1. MADDR15-MADDR00 | 1 | FD 75/40 | Memory Address Bus |
| 2. IRQ/ | 1 | FI 1.25/3.16 (includes 1100 ohm pull-up res) | Line that is used to interrupt the UIOSM. |
| 3. PROMENB/ | 1 | FI 2.25/1.5 | Expanded memory in the application dependent logic can drive this line which when high will allow the enabling of the program PROM on the UIOSM. |
| 4. IOBUS15-IOBUS00 | 1 | FO 373/38.75 FI 2.5/1.5 | BUS lines for GET data to UIOSM (or RAM) or PUT data to application dependent logic. |
| 5. IOBUSPAR | 1 | FO 25/12.5 | Odd parity line for IOBUS15-IOBUS00. |
| 6. REGADDR4-REGADDR0 | 1 | FO 75/40 | External register address lines for GET's and PUT's |
| 7. BUSREQ/ | 1 | FI 5.75/9.65 | When this line is held low the UIOSM address outputs are tri-stated. When this line returns high the Program Generator will be output on the address bus. |
| 8. FLAG3/-FLAG1 | 1 | FI 1.25/3.16 | Condition test lines used by program stack operators. |
| 9. HALTREP/ | 1 | FI 1.25/4.25 | Line which will stop a repeated instuction |
| 10. MRR15 | 1 | FI 1.25/0.25 | Line that is used by mapping logic to control bit 15 of the memory reference register (MRR15). This line should be tied low if mapping is not used. |
| 11. MEMOUT15-MEMOUT00 | 2 | FI 1.25/.25 | Memory output bus. |
| 12. MEMOUTPA | 2 | FI 1.25/.25 | Memory output bus odd parity line. |
| 13. OCREG107-OCREG100 OCREG207-OCREG200 | 2 | FO 160/12.5 | Output control register output data lines. |
| 14. OCREG1CK OCREG2CK | 2 | FI 1.25/0.25 | Clock line for output control registers. |
| 15. ACKI/ | 1 | FO 75/40 | Line that acknowledges that an interrupt request is being accepted by the UIOSM. When this signal is low, the application logic should place an interrupt call address on the I/O bus. |
| 16. PUTSTB3/-PUTSTB1/ | 2 | FO 75/40 | Lines that indicate PUT data is on the I/O bus. |
| 17. RAMRD/ | 2 | FO 23.25/11.25 | This line goes high at least 30 ns before RAMWE/ goes low. It may be used by application logic for generating a synchronized version of RAMWE/. |
| 18. WAIT/ | 2 | FI 1.25/4 (includes 1100 ohm pull-up res) | Line which causes the UIOSM to wait one or more clock periods. |

TABLE XI-continued
GLOSSARY OF UIOSM FRONTPLANE SIGNAL NAMES

| SIGNAL NAME | CONNECTOR NUMBER | FAN-IN/ FAN-OUT* | DESCRIPTION |
|---|---|---|---|
| 19. CLR/ | 2 | FI 1.25/3.16 (includes 1100 ohm pull-up res) | Line which causes the UIOSM to clear. |
| 20. RAMWE/ | 2 | FO 25/12.5 | Write enable for RAM. |
| 21. GETENB/ | 2 | FO 23/11.25 | Line which indicates that GET data should drive into the I/O bus. |
| 22. PARERR/ | 2 | FO 25/12.5 | Line that indicates a parity error was detected on the previous memory fetch. |
| 23. CLKEN | 2 | FI 1.25/4 (includes 1100 ohm pull-up res) | Line that enables the UIOSM clock when high. |
| 24. GETSTB | 1 | FO 25/12.5 | Line used with GETENB/ for application timing. |
| 25. BUSEN/A BUSEN/B | 3 | FI 5/5 | When these lines go high, the I/O bus is disabled. |
| 26. IFETCH/A IFETCH/B | 3 | FO 75/40 | When low, these signals indicate that an instruction OP code is being fetched. |
| 27. BKG/FRGA BKG/FRGB | 3 | FO 75/40 | When these signals are high, the UIOSM is processing an interrupt (running in background mode). |
| 28. MROEB/ | 4 | FO 75/40 | When low, this signal indicates that MRR is being output on the address bus. |
| 29. SC1B,SC2B, SC4, SC8 | 4 | FO 75/40 FO 20/11.25 | Outputs of the State counter. |
| 30. MNTENB/ | 4 | FI 10/5.5 | When low, this line will tri-state the outputs of the five instruction decode PROMS. |
| 31. SMOE/ | 4 | FO 20423/ 8.83 | When low, this signal indicates that the stack memory is being output on the I/O bus. |
| 32. BSAOEX/BSBOEX | 4 | FO 47.75/9.81 | When low, these signals indicate that byte A or B of the byte swap logic will be output on the I/O bus during the next clock. |
| 33. SHAOEX/SHBOEX | 4 | FO 47.75/9.81 | When high, these signals indicate that byte A or B of the shift logic will be output on the I/O bus during the next clock. |
| 34. MRSVOEX/ | 4 | FO 49/9.81 | When low, this signal indicates that the MRR save register will be output on the I/O bus during the next clock. |
| 35. RCOEX/ | 4 | FO 47.75/9.81 | When low, this signal indicates that the repeat counter will be output on the I/O |

TABLE XI-continued

GLOSSARY OF UIOSM FRONTPLANE SIGNAL NAMES

| SIGNAL NAME | CONNECTOR NUMBER | FAN-IN/ FAN-OUT* | DESCRIPTION |
|---|---|---|---|
| | | | bus during the next clock. |
| 36. IIOAOEX/ | 4 | FO 47.75/9.81 | When low, this signal indicates that the most significant (A) byte of the I/O bus will be driven to all zeros during the next clock. |
| 37. PCLD/ | 4 | FO 48/8.98 | When low, this signal indicates that the program counter will be loaded from the I/O bus at the next clock. |
| 38. STKOVF/ | 4 | FO 25/12.5 | This signal goes low during a CALL when this stack address is at maximum (15), or during a RETURN when the stack address is zero. |
| 39. MRLD/ | 4 | FO 3.75/4.75 | When low, this signal indicates that MRR will be loaded from the I/O bus at the next clock. |
| 40. REPEATB | 4 | FO 75/40 | When high, this signal indicates that a repeat operation is in progress. |
| 41. MOPND/ | 4 | FO 48/8.98 | When low, this signal indicates that the memory data being read will be used during the next clock. This signal will be high for unused read data and during memory write cycles. |
| 42. COND/ | 4 | FO 173.75/ 12.47 | When low during a BRANCH, CALL or RETURN, this signal indicates that the selected condition is true. |
| 43. INVOP | 4 | FO 206.75/ 9.47 | When high this signal indicates that an invalid condition was detected in the state machine. Conditions that will cause this term to go high are:<br>1. IRETURN with D3 = 0.<br>2. Repeat made with CALL, BRANCH, RETURN, ICALL or IRETURN operators<br>3. GET or PUT with the state count greater than 1.<br>4. CALL, BRANCH, RETURN, ICALL and RETURN with the state count greater than 2.<br>5. ALU operators other than LOWD, STD, EI, OI, ADDC, SUBC and RSTK with the state count greater than 1.<br>6. Repeat made with the state count not equal to 1.<br>7. STWD or LDWD with D = 0000. |
| 44. ACBWE/ | 4 | FO 23.74/ 12.18 | When low, this signal indicates the "B" (low order) byte of the selected accumulator register is enabled for writing. |
| 45. ACWRITE/ | 4 | FO 7.49/8.43 | When low, this signal indicates that the selected accumulator |

TABLE XI-continued
GLOSSARY OF UIOSM FRONTPLANE SIGNAL NAMES

| SIGNAL NAME | CONNECTOR NUMBER | FAN-IN/ FAN-OUT* | DESCRIPTION |
|---|---|---|---|
| | | | is being written. The "A" (high order) byte is always written and the "B" (low order) byte is controlled by the ACBWE/ signal. |
| 46. STKA0 STKA1 STKA2 STKA3 | 4 | FO 22.48/11 | Program stack address. |
| 47. SMWEX/ | 4 | FO 47.75/9.81 | When low, this signal indicates that the program stack will be written from the I/O bus on the next clock. |
| 48. ENBREP/ | 4 | FO 24/12 | When low, this signal indicates a PUT to the repeat counter is taking place and a repeat operation will start on the next clock. |
| 49. BYTSWPB | 4 | FO 75/40 | When high, this signal indicates that the byte-swap bit is set. |
| 50. SCS0X SCS1X | 4 | FO 47.75/9.81 | These signals indicate that the shift function will be on the next clock: |

| SCS0X | SCS1X | function |
|---|---|---|
| 0 | 0 | shift rt. |
| 1 | 0 | no shift |
| 0 | 1 | shift lft. |
| 1 | 1 | double shift lft. |

| SIGNAL NAME | CONNECTOR NUMBER | FAN-IN/ FAN-OUT* | DESCRIPTION |
|---|---|---|---|
| 51. ALUMDX ALUS3X/ ALUS2X/ ALUS1X ALUX0X | 4 4 4 4 4 | FO 47.75/9.81 FO 47.75/9.81 FO 47.75/9.81 FO 46.5/9.66 FO 46.5/9.66 | These signals indicate what the ALU function will be on the next clock: |

| MD | S3 | S2 | S1 | S0 | Func. |
|---|---|---|---|---|---|
| 1 | 0 | 0 | 1 | 1 | F = A |
| 1 | 0 | 1 | 1 | 0 | F = B |
| 0 | 0 | 1 | 0 | 1 | F = A + B |
| 0 | 0 | 0 | 1 | 1 | F = A − 1 |
| 0 | 1 | 1 | 0 | 0 | F = A + 1 |
| 0 | 1 | 0 | 1 | 0 | F = A − B |
| 1 | 0 | 1 | 1 | 1 | F = A & B |
| 1 | 1 | 0 | 0 | 1 | F = B/ |
| 1 | 1 | 1 | 0 | 0 | F = A/ |
| 1 | 0 | 0 | 0 | 0 | F = 1's |
| 1 | 0 | 0 | 1 | 0 | F = A or B |
| 1 | 1 | 0 | 1 | 0 | F = A or B |
| 1 | 1 | 1 | 1 | 1 | F = 0's |

(F = ALU output, A = Accumulator, B = Memory)

| SIGNAL NAME | CONNECTOR NUMBER | FAN-IN/ FAN-OUT* | DESCRIPTION |
|---|---|---|---|
| 52. D3B | 4 | FO 75/40 | These signals are copies of instruction register bits. |
| F1B | 4 | FO 75/40 | |
| F0B | 4 | FO 75/40 | |
| S2 | 4 | FO 159.75/11.47 | |
| S1 | 4 | FO 159.75 11.47 | (F = Function, D = Destination, |
| S0B | 4 | FO 75/40 | S = Source |
| 53. ACADR2 ACADR1 ACADR0 | 4 4 4 | FO 17.48/9.36 FO 17.48/9.36 FO 17.48/9.36 | Accumulator address. When the state machine internal clock is high, the source accumulator address is present on these signals. When the clock is low the destination accumulator address is present. |
| 54. IOBRCE/ | 4 | FO | When low, this signal causes the I/O bus to go |

TABLE XI-continued
GLOSSARY OF UIOSM FRONTPLANE SIGNAL NAMES

| SIGNAL NAME | CONNECTOR NUMBER | FAN-IN/ FAN-OUT* | DESCRIPTION |
|---|---|---|---|
| 55. MRR/.A MRR/.B | 3 | FO 75/40 | from transmit (output) to receive (input) mode. The signal may be driven from the foreplane with an open-collector driver to control the I/O bus for maintenance purposes. When low, these signals indicate that MRR is output on the address bus. |

*The Fan-in (FI) or Fan-out (FO) is expressed as H/L where H is the high level FI or FO and L is the low level FI or FO. FI or FO is from the point of view of the UIOSM, and is expressed in standard TTL unit loads (40 µA high; and −1.6 mA low)

Note:
Only one each of the following groups of signals will be active on the foreplane at a time. Group A or B will be selected by jumper options for use in a multiple-processor environment. This allows memory/DMA logic to recognize requests from two distinct state machines:
1. BUSEN/A
BUSEN/B
2. IFETCH/A
IFETCH/B
3. BKG/FRGA
BKG/FRGB
4. MRR/.A
MRR/.B The following Tables XII and XII-A through G show the operators of the UIO State Machine.

TABLE XII: UIO STATE MACHINE OPERATORS

NOTES:

(a) The "M" bit is not listed under each operator since it always has the same meaning as earlier defined and actually appears in the instruction to which it applies.

(b) Additionally, the "C" bit is not listed under each operator, since it always has the same meaning as earlier defined.

(c) The following flags are conditioned by ALU operators:
1. The carry flag is only updated during ADD, SUBT, INCR, DECR, ADDC, AND SUBC operators.
2. The ALU=O flag is set if the output of the ALU is all zero's.
3. The MSB flag is set if bit 15 of the I/O bus is zero.
4. The LSB flag is set if bit 0 of the I/O bus is zero.

(d) X=don't care

TABLE XII-A
ARITHMETIC OP'S

1. ADD  Places the results of a binary ADD of accumulator A(S) and memory into accumulator A(D), and/or into the memory reference register (MRR), or merely updates the flag register (null). If the ADD overflows, the carry flag will go true.
   F = 10
   V = 00000
   D = 1[A (D)]        Accumulator A(D)
   0001                Null
   S = [A (S)]         Accumulator A(S)

2. DECR  PLACES THE RESULTS OF MEMORY MINUS 1 INTO ACCUMULATOR A(D), AND/OR INTO THE MEMORY REFERENCE REGISTER (MRR), OR MERELY UPDATES THE FLAG REGISTER (NULL). IF THE DECR UNDERFLOWS, THE CARRY FLAG WILL GO FALSE.
   F = 10
   V = 00001
   D = 1[A(D)]
   ACCUMULATOR A(D)
   0001                NULL
   S = XXX

3. INCR  PLACES THE RESULTS OF MEMORY PLUS 1 INTO ACCUMULATOR A(D), AND/OR INTO THE MEMORY REFERENCE REGISTER (MRR), OR MERELY UPDATES THE FLAG REGISTER (NULL). IF THE INCR OVERFLOWS, THE CARRY FLAG WILL GO TRUE.
   F = 10
   V = 00010
   D = 1[A(D)]         ACCUMULATOR A(D)
   0001                NULL
   S = XXX

4. ROTL  PLACES THE RESULTS OF A LEFT ROTATE BY ONE BIT (MSB INTO LSB) ON ACCUMULATOR A(S) INTO ACCUMULATOR A(D) OR MERELY UPDATES THE FLAG

TABLE XII-A-continued

ARITHMETIC OP'S

|  |  |  |
|---|---|---|
|  | REGISTER (NULL). THE CARRY FLAG IS NOT AFFECTED. | |
|  | F = 10 | |
|  | V = 00011 | |
|  | D = 1[A(D)] | ACCUMULATOR A(D) |
|  | 0001 | NULL |
|  | S = [A(S)] | ACCUMULATOR A(S) |
| 5. ROTR | PLACES THE RESULTS OF A RIGHT ROTATE BY ONE BIT (LSB INTO MSB) ON ACCUMULATOR A(S) INTO ACCUMULATOR A(D) OR MERELY UPDATES THE FLAG REGISTER (NULL). THE CARRY FLAG IS NOT AFFECTED. | |
|  | F = 10 | |
|  | V = 00100 | |
|  | D = 1[A(D)] | ACCUMULATOR A(D) |
|  | 0001 | NULL |
|  | S = [A(S)] | ACCUMULATOR A(S) |
| 6. SHFL | PLACES THE RESULTS OF A LEFT SHIFT BY ONE BIT (ZERO SHIFTED INTO LSB) ON ACCUMULATOR A(S) INTO ACCUMULATOR A(D) OR MERELY UPDATES THE FLAG (NULL). THE CARRY FLAG IS NOT AFFECTED. | |
|  | F = 10 | |
|  | V = 00101 | |
|  | D = 1[A(D)] | ACCUMULATOR A(D) |
|  | 0001 | NULL |
|  | S = [A(S)] | ACCUMULATOR A(S) |
| 7. SHFM | PLACES THE RESULTS OF A LEFT SHIFT BY ONE BIT (ZERO SHIFTED INTO LSB) ON MEMORY INTO ACCUMULATOR A(D), AND/OR INTO THE MEMORY REFERENCE REGISTER (MRR), OR MERELY UPDATES THE FLAG REGISTER (NULL). THE CARRY FLAG IS NOT AFFECTED. | |
|  | F = 10 | |
|  | V = 00110 | |
|  | D = 1[A(D)] | ACCUMULATOR A(D) |
|  | 0001 | NULL |
|  | S = XXX | |
| 8. SHFR | PLACES THE RESULTS OF A RIGHT SHIFT BY ONE BIT (ZERO SHIFTED INTO MSB) ON ACCUMULATOR A(S) INTO ACCUMULATOR A(D) OR RAM, OR MERELY UPDATES THE FLAG REGISTER (NULL). THE CARRY FLAG IS NOT AFFECTED. | |
|  | F = 10 | |
|  | V = 00111 | |
|  | D = 1[A(D)] | ACCUMULATOR A(D) |
|  | 0001 | NULL |
|  | S = [A(S)] | ACCUMULATOR A(S) |
| 9. SUBT | PLACES THE RESULTS OF A BINARY SUBTRACT ON MEMORY AND ACCUMULATOR A(S) (MEMORY MINUS A(S)) INTO ACCUMULATOR A(D),AND/OR INTO THE MEMORY REFERENCE REGISTER (MRR), OR MERELY UPDATES THE FLAG REGISTER (NULL). IF THE SUBT UNDERFLOWS, THE CARRY FLAG WILL GO FALSE. | |
|  | F = 10 | |
|  | V = 01000 | |
|  | D = 1[A(D)] | ACCUMULATOR A(D) |
|  | 0001 | NULL |
|  | S = [A(S)] | ACCUMULATOR (S) |
| 10. DRTL | PLACES THE RESULTS OF A LEFT ROTATE BY 2 BITS ON ACCUMULATOR A(S) INTO ACCUMULATOR A(D) OR RAM, OR MERELY UPDATES THE FLAG REGISTER (NULL). THE CARRY FLAG IS NOT AFFECTED. | |
|  | V = 10111 | |
|  | D = 1[A(D)] | ACCUMULATOR A(D) |
|  | 0001 | Null |
|  | S = [A(S)] | ACCUMULATOR A(S) |

TABLE XII-B

LOGICAL OP'S

|  |  |  |
|---|---|---|
| 1. AND | PLACES THE RESULTS OF A LOGICAL AND ON ACCUMULATOR A(S) AND MEMORY (A * M) INTO ACCUMULATOR A(D), AND/OR INTO THE MEMORY REFERENCE REGISTER (MRR), OR MERELY UPDATES THE FLAG REGISTER (NULL). THE CARRY FLAG IS NOT AFFECTED. | |
|  | F = 10 | |
|  | V = 01001 | |
|  | D = 1[A(D)] | ACCUMULATOR A(D) |
|  | 0001 | NULL |
|  | S = [A(S)] | ACCUMULATOR A(S) |
| 2. CMA | PLACES THE COMPLEMENT OF ACCUMULATOR A(S) INTO | |

TABLE XII-B-continued

LOGICAL OP'S

ACCUMULATOR A(D) AND/OR INTO THE MEMORY REFERENCE
REGISTER (MRR), OR MERELY UPDATES THE FLAG REGISTER
(NULL). THE CARRY FLAG IS NOT AFFECTED.
    F = 10
    V = 01010
    D = 1[A(D)]        ACCUMULATOR A(D)
        0001            NULL
    S = [A(S)]         ACCUMULATOR A(S)

3. CMM   PLACES THE COMPLEMENT OF MEMORY INTO ACCUMULATOR
A(D), AND/OR INTO THE MEMORY REFERENCE REGISTER (MRR),
OR MERELY UPDATES THE FLAG REGISTER (NULL).
THE CARRY FLAG IS NOT AFFECTED.
    F = 10
    V = 01011
    D = 1[A(D)]        ACCUMULATOR A(D)
        0001            NULL
    S = XXX

4. ONES   SETS ACCUMULATOR A(D) AND/OR THE MEMORY REFERENCE
REGISTER (MRR) TO ALL ONES OR MERELY UPDATES THE
FLAG REGISTER (NULL). THE CARRY FLAG IS NOT
AFFECTED.
    F = 10
    V = 01100
    D = 1[A(D)]        ACCUMULATOR A(D)
        0001            NULL
    S = XXX

5. OR   PLACES THE RESULTS OF A LOGICAL OR ON
ACCUMULATOR A(S) AND MEMORY (A + M) INTO
ACCUMULATOR A(D), AND/OR INTO THE MEMORY REFERENCE
REGISTER (MRR), OR MERELY UPDATES THE FLAG REGISTER
(NULL). THE CARRY FLAG IS NOT AFFECTED.
    F = 10
    V = 01101
    D = 1[A(D)]        ACCUMULATOR A(D)
        0001            NULL
    S = [A(S)]         ACCUMULATOR A(S)

6. XOR   PLACES THE RESULTS OF A LOGICAL EXCLUSIVE OR ON
ACCUMULATOR A(S) AND MEMORY (A EXOR M) INTO
ACCUMULATOR A(D), AND/OR INTO THE MEMORY REFERENCE
REGISTER (MRR), OR MERELY UPDATES THE FLAG REGISTER
(NULL). THE CARRY FLAG IS NOT AFFECTED.
    F = 10
    V = 01110
    D = 1[A(D)]        ACCUMULATOR A(D)
        0001            NULL
    S = [A(S)]         ACCUMULATOR A(S)

7. ZERO   SETS ACCUMULATOR A(D) AND/OR THE MEMORY REFERENCE
REGISTER (MRR) TO ALL ZEROS OR MERELY UPDATES
THE FLAG REGISTER (NULL). THE CARRY FLAG IS NOT
AFFECTED.
    F = 10
    V = 01111
    D = 1[A(D)]        ACCUMULATOR A(D)
        0001            NULL
    S = XXX

8. ADDC   PLACES THE RESULTS OF A BINARY ADD OF ACCUMULATOR
A(S), MEMORY, AND THE CARRY FLAG INTO ACCUMULATOR
A(D), AND/OR INTO THE MEMORY REFERENCE REGISTER
(MRR) OR MERELY UPDATES THE FLAG REGISTER (NULL).
IF THE ADD OVERFLOWS, THE CARRY FLAG WILL GO TRUE.
    F = 10
    V = 11100
    D = 1[A(D)]        ACCUMULATOR A(D)
        0001            NULL
    S = [A(S)]         ACCUMULATOR A(S)

9. SUBC   PLACES THE RESULT OF A BINARY SUBTRACT ON MEMORY
AND ACCUMULATOR A(S), LESS THE CARRY FLAG, (MEMORY
MINUS A(S) MINUS CARRY) INTO ACCUMULATOR A(D), AND/
OR INTO THE MEMORY REFERENCE REGISTER (MRR), OR
MERELY UPDATES THE FLAG REGISTER (NULL). IF THE
SUBT UNDERFLOWS, THE CARRY FLAG WILL GO FALSE.
    F = 10
    V = 11101
    D = 1[A(D)]        ACCUMULATOR A(D)
        0001            NULL
    S = [A(S)]         ACCUMULATOR A(S)

TABLE XII-C
PROGRAM STACK OP'S
Note: THE FOLLOWING INSTRUCTIONS DO NOT AFFECT CONDITION FLAGS.

1. BRANCH  IF THE CONDITION TEST IS TRUE, THE PROGRAM COUNTER (PC) WILL BE REPLACED WITH ACCUMULATOR A(S) OR WITH A LITERAL STORED IN MEMORY.
    F = 11
    V = 10000    BRANCH UNCONDITIONALLY (OR NOT)
        10001    BRANCH ON ALU = 0 (OR NOT)
        10010    BRANCH ON ALU MSB = 0 (OR NOT)
        10011    BRANCH ON ALU CARRY = 1 (OR NOT)
        10100    BRANCH ON ALU LSB = 0 (OR NOT)
        10101    BRANCH ON EXTERNAL FLAG 1 = 1 (OR NOT)
        10110    BRANCH ON EXTERNAL FLAG 2 = 1 (OR NOT)
        10111    BRANCH ON EXTERNAL FLAG 3 = 1 (OR NOT)
    D = SXXF  S = 0  BRANCH ADDRESS IN MEMORY
              S = 1  BRANCH ADDRESS IN ACCUMULATOR A(S)
              F = 1  EXECUTE ON CONDITION TEST TRUE
              F = 0  EXECUTE ON CONDITION TEST NOT TRUE
    S = XXX       IF BRANCH ADDRESS IS IN MEMORY
        [A(S)]    IF BRANCH ADDRESS IS IN ACCUMULATOR A(S)

2. CALL  IF THE CONDITION TEST IS TRUE, THE PROGRAM COUNTER (PC) WILL BE REPLACED WITH ACCUMULATOR A(S) OR WITH A LITERAL STORED IN MEMORY, AND THE OLD PROGRAM COUNT (+1 IF M = 1, +2 IF M = 0) WILL BE PUSHED INTO THE PROGRAM STACK. UP TO 16 CALLS CAN BE MADE FROM THE INITIAL PROGRAM START POINT.
    F = 11
    V = 01000    CALL UNCONDITIONALLY (OR NOT)
        01001    CALL ON ALU = 0 (OR NOT)
        01010    CALL ON ALU MSB = 0 (OR NOT)
        01011    CALL ON ALU CARRY = 1 (OR NOT)
        01100    CALL ON ALU LSB = 0 (OR NOT)
        01101    CALL ON EXTERNAL FLAG 1 = 1 (OR NOT)
        01110    CALL ON EXTERNAL FLAG 2 = 1 (OR NOT)
        01111    CALL ON EXTERNAL FLAG 3 = 1 (OR NOT)
    D = SXXF  S = 0  CALL ADDRESS IN MEMORY
              S = 1  CALL ADDRESS IN ACCUMULATOR A(S)
              F = 1  EXECUTE ON CONDITION TEST TRUE
              F = 0  EXECUTE ON CONDITION TEST NOT TRUE
    S = XXX       IF CALL ADDRESS IS IN MEMORY
        [A(S)]    IF CALL ADDRESS IS IN ACCUMULATOR A(S)

3. RETURN  IF THE CONDITION TEST IS TRUE, THE PROGRAM COUNTER WILL BE REPLACED WITH THE LAST VALUE STORED IN THE PROGRAM STACK.
    F = 11
    V = 11000    RETURN UNCONDITIONALLY (OR NOT)
        11001    RETURN ON ALU = 0 (OR NOT)
        11010    RETURN ON ALU MSB = 0 (OR NOT)
        11011    RETURN ON ALU CARRY =1 (OR NOT)
        11100    RETURN ON ALU LSB = 0 (OR NOT)
        11101    RETURN ON EXTERNAL FLAG 1 = 1 (OR NOT)
        11110    RETURN ON EXTERNAL FLAG 2 = 1 (OR NOT)
        11111    RETURN ON EXTERNAL FLAG 3 = 1 (OR NOT)
    D = 1XX1     EXECUTE ON CONDITION TEST TRUE
        1XX0     EXECUTE ON CONDITION TEST NOT TRUE
    S = XX0

4. ICALL  THIS INSTRUCTION IS FORCED BY HARDWARE TO ENTER INTERRUPT MODE. THE BACKGROUND FLAGS AND ACCUMULATOR ARE ACTIVE AFTER THIS INSTRUCTION IS EXECUTED. MRR IS SAVED IN THE MRR SAVE REGISTER AND THEN PC (PC IS INCREMENTED) IS STORED IN THE PROGRAM STACK. THE ADDRESS PROVIDED BY THE APPLICATION LOGIC ON THE I/O BUS IS LOADED IN PC.
    F = 11
    V = 11111
    D = 1111
    S = 111
    M = 1
    C = 1

5. IRETURN  EXITS INTERRUPT MODE, RESTORES MRR, AND REPLACES THE PROGRAM COUNTER WITH THE LAST VALUE STORED IN THE PROGRAM STACK. THE FOREGROUND FLAGS AND ACCUMULATORS ARE ACTIVE AFTER THIS INSTRUCTION IS EXECUTED.
    F = 11
    V = 00XXX
    D = 1XXX
    S = XXX

6. BCALL  THIS INSTRUCTION ALLOWS ENTRY INTO BACKGROUND MODE FOR MAINTENANCE PURPOSES. BACKGROUND MODE IS ENTERED AND PC+1 IS STORED ON THE STACK. THE

TABLE XII-C-continued
PROGRAM STACK OP'S
Note: THE FOLLOWING INSTRUCTIONS DO NOT AFFECT CONDITION FLAGS.

INSTRUCTION AT PC+1 IS THEN EXECUTED.
F = 11
V = 11111
D = 01111
S = XX1

TABLE XII-D
LOAD, STORE, AND MOVE OP'S
Note: The following instructions make reference to a memory operand word or source accumulator word as (AB) where the left character (A) is the high order byte and the right character (B) is the low order byte. These instructions will condition all flags except the carry flag.

1. RDW   (READ WORD) PLACES THE CONTENTS OF MEMORY (AB) INTO ACCUMULATOR A(D) AS AB, AND/OR INTO THE MEMORY REFERENCE REGISTER (MRR) AS AB, OR MERELY UPDATES THE FLAG REGISTER (NULL).
   F = 10
   V = 10000
   D = 1[A(D)]         ACCUMULATOR A(D)
       0001            NULL
   S = XXX

2. RDB   (READ BYTE) PLACES THE CONTENTS OF MEMORY (AB) INTO ACCUMULATOR A(D) AS 0A IF THE BYTE SWAP BIT IS 0 OR AS 0B IF THE BYTE SWAP BIT IS 1.
   F = 10
   V = 10001
   D = 1[A(D)]         ACCUMULATOR A(D)
       0001            NULL
   S = XXX

3. RDBW  (READ BEFORE WRITE BYTE) PLACES THE CONTENTS OF MEMORY (AB) INTO ACCUMULATOR A(D) AS AX IF THE BYTE SWAP BIT IS 1 OR AS BX IF THE BYTE SWAP BIT IS 0. THE X BYTE INDICATES THAT THE DESTINATION ACCUMULATOR A(D) IS UNCHANGED FOR THAT BYTE.
   F = 10
   V = 10010
   D = 1[A(D)]         ACCUMULATOR A(D)
       0001            NULL
   S = XXX

4. RBWR  (READ BEFORE WRITE BYTE REVERSED) PLACES THE CONTENTS OF MEMORY (AB) IN ACCUMULATOR A(D) AS AX IF THE BYTE SWAP BIT IS 0 OR AS BX IF THE BYTE SWAP BIT IS 1. THE X BYTE INDICATES THAT THE DESTINATION ACCUMULATOR A(D) IS UNCHANGED FOR THAT BYTE.
   F = 10
   V = 10110
   D = 1[A(D)]         ACCUMULATOR A(D)
       0001            NULL
   S = XXX

5. SWAC  (SWAP ACCUMULATOR) PLACES THE CONTENTS OF ACCUMULATOR A(S) (AB) INTO ACCUMULATOR A(D) AS BA.
   F = 10
   V = 10011
   D = 1[A(D)]         ACCUMULATOR A(D)
       0001            NULL
   S = [A(S)]          ACCUMULATOR A(S)
   M = 1

6. WRTW  (WRITE WORD) PLACES THE CONTENTS OF ACCUMULATOR A(S) (AB) INTO ACCUMULATOR A(D) AS AB, AND/OR INTO THE MEMORY REFERENCE REGISTER (MRR) AS AB, OR INTO RAM MEMORY AS AB, OR MERELY UPDATES THE FLAG REGISTER (NULL).
   F = 10
   V = 10100
   D = 1[A(D)]         ACCUMULATOR A(D)
       0000            RAM MEMORY
       0001            NULL
   S = [A(S)]          ACCUMULATOR A(S)
   M = 1

7. WRTB  (WRITE BYTE) PLACES THE CONTENTS OF ACCUMULATOR A(S) (AB) INTO ACCUMULATOR A(D) OR RAM MEMORY AS AB IF THE BYTE SWAP BIT IS 1 OR BA IF THE BYTE SWAP BIT IS 0.
   F = 10
   V = 10101           ACCUMULATOR D(S)

TABLE XII-D-continued

LOAD, STORE, AND MOVE OP'S
Note: The following instructions make reference to a memory operand word or source accumulator word as (AB) where the left character (A) is the high order byte and the right character (B) is the low order byte. These instructions will condition all flags except the carry flag.

|  |  |  |
|---|---|---|
|  | D = 1[A(D)] | RAM |
|  | 0001 | NULL |
|  | S = [A(S)] | ACCUMULATOR A(S) |
|  | M = 1 |  |
| 8. LDWD | (LOAD WORD DIRECT) PLACES THE CONTENTS OF MEMORY INTO MRR. PLACES THE CONTENTS OF MEMORY POINTED TO BY THE NEW CONTENTS OF MRR INTO ACCUMULATOR A(D) (AB), AND/OR INTO MRR, OR MERELY UPDATES THE FLAG REGISTER (NULL). | |
|  | F = 10 |  |
|  | V = 11000 |  |
|  | D = 1[A(D)] | ACCUMULATOR A(D) |
|  | S = XXX |  |
| 9. STWD | (STORE WORD DIRECT) PLACES THE CONTENTS OF MEMORY INTO MRR. PLACES THE CONTENTS OF ACCUMULATOR A(S) (AB) INTO RAM MEMORY AT THE ADDRESS POINTED AT BY THE NEW MRR VALUE, AND/OR INTO MRR. | |
|  | F = 10 |  |
|  | V = 11001 |  |
|  | D = 0001 |  |
|  | S = [A(S)] | ACCUMULATOR A(S) |
| 10. RSTK | (READ STACK) PLACES THE CONTENTS OF THE TOP WORD OF THE STACK (RETURN ADDRESS) INTO ACCUMULATOR A(D). | |
|  | F = 10 |  |
|  | V = 11110 |  |
|  | D = 1[A(D)] | ACCUMULATOR A(D) |
|  | 0001 | NULL |
|  | S = XXX |  |

TABLE XII-E

GET AND PUT OP'S
NOTE: The following instructions do not affect condition flags.

| | | |
|---|---|---|
| 1. GET | PLACES CONTENTS OF EXTERNAL REGISTER R(N) OR THE REPEAT COUNTER INTO ACCUMULATOR A(D), OR INTO RAM MEMORY. THE "C" BIT MUST BE 1 IN THE INSTRUCTION. THE "M" BIT MUST BE 1 IN THIS INSTRUCTION. | |
|  | F = 00 | |
|  | V = [R(N)] | EXTERNAL REGISTER R(N) |
|  | D = 1[A(D)] | ACCUMULATOR A(D) |
|  | 0000 | RAM MEMORY |
|  | 0001 | NULL |
|  | S = XX0 | APPLICATION REGISTER |
|  | XX1 | REPEAT COUNTER |
| 2. PUT | PLACES CONTENTS OF ACCUMULATOR A(S) OR MEMORY INTO EXTERNAL REGISTER R(N). THREE SEPARATE "STROBE" LINES CAN ALSO BE GENERATED FOR USE BY THE APPLICATION DEPENDENT LOGIC. THE CONTENTS OF ACCUMULATOR A(S) OR MEMORY CAN ALSO BE COPIED TO THE MEMORY REFERENCE REGISTER (MRR). | |
|  | F = 01 | |
|  | V = [R(N)] | EXTERNAL REGISTER R(N) |
|  | D = SFFF | S = 0 PUT FROM MEMORY |
|  |  | S = 1 PUT FROM ACCUMULATOR A(S) |
|  |  | FFF = 000 GENERATE STROBE #1 |
|  |  | FFF = 001 GENERATE STROBE #2 |
|  |  | FFF = 010 GENERATE STROBE #3 |
|  |  | FFF = 011 LOAD AND ENABLE REPETITION COUNTER |
|  | S = XXX | IF PUT FROM MEMORY |
|  | [A(S)] | IF PUT FORM ACCUMULATOR A(S) |

TABLE XII-F

MISCELLANEOUS OP'S
NOTE: The following instructions do affect condition flags.

| | | |
|---|---|---|
| 1. EI | RESETS THE INTERRUPT MASK BIT. | |
|  | F = 10 | |
|  | V = 11010 | |
|  | D = 0001 | NULL |
|  | S = XXX | |
| 2. DI | SETS THE INTERRUPT MASK BIT. | |
|  | F = 10 | |
|  | V = 11011 | |
|  | D = 0001 | NULL |
|  | S = XXX | |

TABLE XII-G

ALU OP CODE SUMMARY TABLE (F = 10)
Note: This code summary table for the Function Variant Field V is listed in reference to:
Arithmetic Op's (Table XII-A)
Logical OP's (Table XII-B)
Load, Store, Move OP's (Table XII-D)

| V3 | V2 | V1 | V0 | V4 = 0 | V4 = 1 |
|---|---|---|---|---|---|
| 0 | 0 | 0 | 0 | ADD | RDW |
| 0 | 0 | 0 | 1 | DECR | RDB |
| 0 | 0 | 1 | 0 | INCR | RDBW |
| 0 | 0 | 1 | 1 | ROTL | SWAC |
| 0 | 1 | 0 | 0 | ROTR | WRTW |
| 0 | 1 | 0 | 1 | SHFL | WRTB |
| 0 | 1 | 1 | 0 | SFHM | RBWR |
| 0 | 1 | 1 | 1 | SHFR | DRTL |
| 1 | 0 | 0 | 0 | SUBT | LDWD |
| 1 | 0 | 0 | 1 | AND | STWD |
| 1 | 0 | 1 | 0 | CMA | EI |
| 1 | 0 | 1 | 1 | CMM | DI |
| 1 | 1 | 0 | 0 | ONES | ADDC |
| 1 | 1 | 0 | 1 | OR | SUBC |
| 1 | 1 | 1 | 0 | XOR | RSTK |
| 1 | 1 | 1 | 1 | ZERO | Reserved |

Byte Oriented Read/Write Operators

As was previously discussed, the UIO-SM has been implemented with several operators to simplify the processing of byte-oriented data even though the memory is organized in words which are two bytes wide. These particular operators work in conjunction with the memory reference register 40 of FIG. 2 which addresses external RAM data memory 90.

The byte-oriented read/write operators use the "byte-swap" feature of the UIO-SM such that the "desired" byte is always read from external memory (90) into the "low order" byte of a selected register of the destination accumulator A(D) even though the desired byte might have been in the "high" order byte of the memory location in 90. The desired byte, after being placed into the destination accumulator A(D), can then be processed. After the low order byte is processed, the high order byte of the accumulator A(D) must be updated with the other byte from the current data memory location, and then the two bytes are written into memory 90 as one word, and each byte will go into the proper position. This would be needed, for example, when a card reader peripheral is supplying only one byte of a word for each transfer operation.

In the case of byte-oriented operators, the decision whether or not to "byte-swap" is determined by the low order bit of the memory reference register 40 which, in essence, is a byte-address. The following Table XIII is an example which illustrates the use of these operators in handling sequential byte data which is stored in memory 90.

The next following Table XIV shows a sequence of instructions and the resultant signals in the memory reference register 40, the accumulator register 30 and the data memory 90. Thus, the sequence shown in Table XIV starts with loading the memory reference register 40; reading the byte (RDB); translation; read before write byte (RDBW); write byte (WRTB); incrementing the memory reference register (MRR 40); again read byte (RDB) again translate; again read before write byte (RDBW); write byte (WRTB); incrementing memory reference register 40; read byte (RDB); translate; read before write byte (RDBW); write byte (WRTB); and so on.

TABLE XIII

HANDLING SEQUENTIAL BYTE DATA

| Data Memory Address* | Memory Data (MSB$_y$-LSB$_y$***) | |
|---|---|---|
| 0 | A | B |
| 1 | C | D |
| 2 | E | F |

Sequential Data to be Processed = ABCDEF
*Actually, the first UIOSM instruction must be in address zero if there is no physical separation between program memory and data memory.
**MSB = Most Significant Byte, LSB = Least Significant Byte
Note: the symbols ABCD here refer to successive bytes of memory data to be processed in sequence

TABLE XIV

EXEMPLARY SEQUENCE OF INSTRUCTIONS

| INSTRUCTION | MRR | MRRLSB* | ACCUMULATOR DATA (MSB$_y$-LSB$_y$*) | | MEMORY DATA (MSB$_y$-LSB$_y$*) | |
|---|---|---|---|---|---|---|
| Load MRR with starting addr of seq. data | 0 | 0 | | | | |
| RDB | | | 0 | A | | |
| process (translate) | | | X | A' | | |
| RDBW | | | B | A' | | |
| WRTB | | | | | A' | B |
| increment MRR | 0 | 1 | | | | |
| RDB | | | 0 | B | | |
| process (translate) | | | X | B' | | |
| RDBW | | | A' | B' | | |
| WRTB | | | | | A' | B' |
| increment MRR | 1 | 0 | | | | |
| RDB | | | 0 | C | | |
| process (translate) | | | X | C' | | |
| RDBW | | | D | C' | | |
| WRTB | | | | | C' | D |
| etc. | | | | | | |

*MRRLSB = MRR Least Significant Bit. This bit does not address memory but is used by the UIOSM to determine whether or not to byte swap on byte oriented op's.
**MSB$_y$ = Most Significant Byte, LSB$_y$ = Least Significant Byte A further "byte-oriented" operator has been implemented into the UIO-SM and is illustrated in the following Table XV. This operator aids in the formation of a "two-byte" data word where the two bytes are sequentially located in data memory 90. But unless several OP's are used, it is not known whether or not the two desired bytes are in a single memory location or whether they straddle two memory locations.

The upper portion of Table XV shows the arrangement of data in a first Memory 1 and a second Memory 2 corresponding to true and false signals of the data memory address. Then the lower part of Table XV shows an exemplary sequence for the sequential instructions with reference to data in the memory reference register 40 and in the accumulator 30.

TABLE XV

| Data Memory Address | Memory Data 1 (MSB$_y$-LSB$_y$) | | Memory Data 2 (MSB$_y$-LSB$_y$) | |
|---|---|---|---|---|
| 0 | B | C | A | B |
| 1 | D | E | C | D |

Desired Sequential Data = CD

| INSTRUCTION | MRR | MRRLSB* | ACCUMULATOR DATA (MSB$_y$-LSB$_y$**) | |
|---|---|---|---|---|
| Memory Data 1 Case: load MRR with data ending address | 1 | 0 | | |
| RDB | | | 0 | D |
| decrement MRR | 0 | 1 | | |
| RBWR | | | C | D |
| Memory Data 2 Case: load MRR with data ending address | 1 | 1 | | |
| RDB | | | 0 | D |
| decrement MRR | 1 | 0 | | |
| RBWR | | | C | D |

*MRRLSB = MRR least significant bit. This bit does not address memory but is used by the UIOSM to determine whether or not to byte swap on byte oriented OP's.

**MSB$_y$ = Most significant byte. LSB$_y$ = least significant byte

What is claimed is:

1. A universal-type microprocessor system which cooperates with an application-dependent logic module to form a peripheral-controller capable of handling data transfers between main memory of a host computer and a plurality of peripheral terminal units which can be either "word-oriented" or "byte-oriented", and wherein said application-dependent logic module provides external register means having bus connections to said plurality of peripheral terminal units and to said host computer, and wherein said application-dependent logic module further includes an external memory for storage of programs related to control of said peripheral terminal units and for temporary storage of data undergoing transfer, and wherein said application-dependent logic module further includes control logic means for communicating with and controlling: said external register means, said external memory and communicating with a decoder-controller in said microprocessor system, the said microprocessor system comprising:

(a) data processing means including:
      (a1) an Arithmetic logic Unit providing an output to a shift logic circuit and to a byte-swap circuit;
      (a2) a shift logic circuit providing output to an I/O bus;
      (a3) a byte-swap circuit providing output to said I/O bus;
   (b) an I/O bus providing connecting lines from said data processing means to said external registers, to said external memory, to an accumulator register means, and to an addressing means;
   (c) addressing means receiving input data from said I/O bus and storing addresses used for accessing data from internal or external memory, said addressing means including:
      (c1) a program counter storing consecutive addresses of data located in an internal program memory;
      (c2) a memory reference register for storing addresses of data located in said external memory, and including:
         (c2-1) a memory address bus which connects to said external memory;
      (c3) an address register means in said decoder-controller and providing an address bus to a plurality of accumulator registers for selection of data from/to an addressed accumulator register;
   (d) internal program memory for storing program instructions and data words, said internal memory being addressed from said program counter and providing instruction words and data, via an instruction bus, to a register means.
   (e) register means for temporary storage of data, said register means including:
      (e1) a plurality of addressable accumulator registers which provide an output to the input of said Arithmetic Logic Unit, said accumulator registers receiving input data words from said I/O bus, said plurality of accumulator registers, including:
         (e1-1) address bus means from said decoder-controller for addressing selected registers in said plurality of accumulator registers;
      (e2) a memory operand register for receiving operand data from said internal program memory via an instruction bus or from said external memory via a memory data bus; said operand register providing an output to the input of said Arithmetic Logic Unit;
      (e3) an instruction register for receiving instruction words and data from said internal program memory via said instruction bus or receiving data from said external memory via a memory data bus and providing instruction words and data to said decoder-controller;
   (f) an instruction decoder-controller receiving instruction signals from said instruction register, and including incoming and outgoing control signal lines connected to said data processing means, to said addressing means, to said register means, to said internal and external memory means, to said external registers and said control logic means;
   (g) an external memory data bus for carrying data from said external memory to said instruction register and said memory operand register.
   (h) program instruction words in said internal program memory wherein each instruction word includes a bit field "M" which is used to signal said decoder-controller to select either said program counter or said memory reference register as the next address source for data to be transmitted to said instruction register or said memory operand register.

2. The microprocessor system of claim 1 wherein said memory reference register further includes:
      (c2-2) a dedicated non-address bit (byte-select bit) in each address-data location for signalling said decoder-controller to initiate a byte-swap operation in said byte-swap circuit, when said byte select bit is "set".

3. The microprocessor system of claim 2 wherein said byte-swap circuit will pass data without a byte-swap operation when said byte-select bit is "not-set".

4. The microprocessor system of claim 1 wherein a value of "M" equal to "1" will signal said decoder-controller to select the said memory reference register as the next source of address data for accessing a location in external memory.

5. The microprocessor system of claim 1 wherein a value of "M" equal to "0" will signal said decoder-controller to select said program counter as the next address source for accessing a location in said program memory.

6. The microprocessor system of claim 1 wherein the instruction fetch cycle for accessing the next instruction occurs simultaneously with the execute cycle of the current instruction.

7. The microprocessor system of claim 1 wherein said program instruction words include:
- a dedicated single bit field "C" in each instruction word for signalling said decoder-controller to enable said arithmetic logic unit and said I/O bus to load the output data of said arithmetic logic unit into said memory reference register.

8. The microprocessor system of claim 7 wherein said program instruction words include:
- a decicated field (source-field) for locating the data to be selected as source-data for transfer and/or processing;
- a dedicated field (destination-field) for locating the destination-location of said source-data.

9. The microprocessor system of claim 8 wherein said source-field provides signals to said decoder-controller to address and select a location in:
  (i) said accumulator register; or
  (ii) said external register; or
  (iii) said program stack.

10. The microprocessor system of claim 9 which includes:
- a plurality of flag registers having inputs from said Arithmetic Logic Unit, and output signal lines to said decoder-controller.

11. The microprocessor system of claim 9 wherein said destination-field provides signals to said decoder-controller to address and select a location in:
  (i) said accumulator register; or
  (ii) said external memory.

12. The microprocessor system of claim 10 wherein said destination field provides signals to said Arithmetic Logic Unit to updata said flag registers.

* * * * *

UNITED STATES PATENT AND TRADEMARK OFFICE
CERTIFICATE OF CORRECTION

PATENT NO. : 4,290,106
DATED : September 15, 1981
INVENTOR(S) : Robert D. Catiller and Brian K. Forbes It is certified that error appears in the above—identified patent and that said Letters Patent is hereby corrected as shown below:

Col. 6, line 1, change "controller" second occurrence to --control--.
Col. 8, line 48, change "10;" to --$10_i$--.
Col. 10, line 6, change "their" to --the--.
         line 50, change "5" to --6--.
Col. 11, line 3, after "fetching" insert --the operand of--.
Col. 12, line 7, change "Op'2)" to --Op's)--.
         line 64, change "and" to --an--.
Col. 14, line 2, change "256" to --255--;
         line 45, change "valve" to --value--;
         line 61, change "(half" to --(halt--.
Col. 15, line 30, change "updates" to --updated--;
         line 59, change "STROBEsignal" to --STROBE/ signal--.
Col. 16, line 7, change "64 K" to --64K--;
         line 8, change "32 K" to --32K--;
         line 25, change "8 K" to --8K--;
                  change "64 K" to --64K--.
Col. 18, line 14, change "reults" to --results--.
Col. 20, line 52, change "STAKO" to --STKAO--.
Col. 46, line 24, change "updata" to --update--.

Signed and Sealed this

Eighth Day of December 1981

[SEAL]

Attest:

GERALD J. MOSSINGHOFF

*Attesting Officer*    *Commissioner of Patents and Trademarks*